US012259690B2

(12) United States Patent  
Pandya et al.

(10) Patent No.: US 12,259,690 B2  
(45) Date of Patent: Mar. 25, 2025

(54) WATCH CROWN HAVING A CONDUCTIVE SURFACE

(71) Applicant: Apple Inc., Cupertino, CA (US)

(72) Inventors: Sameer Pandya, Sunnyvale, CA (US); Steven C. Roach, San Francisco, CA (US); Colin M. Ely, Sunnyvale, CA (US); Erik G. de Jong, San Francisco, CA (US)

(73) Assignee: Apple Inc., Cupertino, CA (US)

(*) Notice: Subject to any disclaimer, the term of this patent is extended or adjusted under 35 U.S.C. 154(b) by 1172 days.

(21) Appl. No.: 16/255,685

(22) Filed: Jan. 23, 2019

(65) Prior Publication Data

US 2020/0064779 A1    Feb. 27, 2020

Related U.S. Application Data

(60) Provisional application No. 62/725,230, filed on Aug. 30, 2018, provisional application No. 62/722,796, filed on Aug. 24, 2018.

(51) Int. Cl.
  *G04C 3/00*  (2006.01)
  *G06F 1/16*  (2006.01)
  *G06F 3/0488*  (2022.01)

(52) U.S. Cl.
  CPC ............. *G04C 3/001* (2013.01); *G04C 3/008* (2013.01); *G06F 1/1626* (2013.01); *G06F 3/0488* (2013.01)

(58) Field of Classification Search
  CPC combination set(s) only.
  See application file for complete search history.

(56) References Cited

U.S. PATENT DOCUMENTS

| 2,237,860 A | 4/1941 | Bolle |
| 2,288,215 A | 6/1942 | Taubert et al. |

(Continued)

FOREIGN PATENT DOCUMENTS

| CH | 1888928 | 1/1937 |
| CN | 1302740 | 9/2001 |

(Continued)

OTHER PUBLICATIONS

Narayanaswami et al., "Challenges and considerations for the design and production of a purpose-optimized body-worn wristwatch computer," Defense, Security, and Cockpit Displays, 2004.

(Continued)

*Primary Examiner* — William Boddie  
*Assistant Examiner* — Alecia D English  
(74) *Attorney, Agent, or Firm* — Brownstein Hyatt Farber Schreck, LLP

(57) ABSTRACT

An electronic device, such as a watch, has an input mechanism, such as a crown, that may receive translational inputs, rotational inputs, and/or touch inputs. Inputs received at the crown may result in changes in operation of the electronic device and/or outputs, such as graphical outputs, provided by the electronic device. In various embodiments, the crown includes a retainer that couples an outer crown body to an inner crown body and secures an isolator between the outer crown body and the inner crown body. The embodiments of the crown described herein provide a simple and robust input mechanism for receiving rotational, translational, and touch inputs as described above, while simplifying part alignment, ensuring consistent rotation, and allowing for efficient manufacturing.

20 Claims, 22 Drawing Sheets

(56) References Cited

U.S. PATENT DOCUMENTS

| | | |
|---|---|---|
| 2,497,935 A | 2/1950 | Feurer |
| 2,771,734 A | 11/1956 | Morf |
| 2,788,236 A | 4/1957 | Kafowi |
| 2,797,592 A | 7/1957 | Marrapese |
| 3,040,514 A | 6/1962 | Dinstman |
| 3,056,030 A | 9/1962 | Kelchner |
| 3,130,539 A | 4/1964 | Davis |
| 3,355,873 A | 12/1967 | Morf |
| 3,362,154 A | 1/1968 | Perret |
| 3,410,247 A | 11/1968 | Dronberger |
| 3,495,398 A | 2/1970 | Widmer et al. |
| 3,577,876 A | 5/1971 | Spadini |
| 3,621,649 A | 11/1971 | Vulcan et al. |
| 3,662,618 A | 5/1972 | Kroll et al. |
| 3,733,803 A | 5/1973 | Hiraga |
| 3,937,002 A | 2/1976 | Van Haften |
| 4,007,347 A | 2/1977 | Haber |
| 4,031,341 A | 6/1977 | Wuthrich et al. |
| 4,037,068 A | 7/1977 | Gaynor |
| 4,051,665 A | 10/1977 | Arn |
| 4,077,200 A | 3/1978 | Schneider |
| 4,133,404 A | 1/1979 | Griffin |
| 4,170,104 A | 10/1979 | Yamagata |
| 4,258,096 A | 3/1981 | LaMarche |
| 4,274,152 A | 6/1981 | Ikegami |
| 4,287,400 A | 9/1981 | Kitik |
| 4,289,400 A | 9/1981 | Kubola et al. |
| 4,311,026 A | 1/1982 | Ochoa |
| 4,311,990 A | 1/1982 | Burke |
| 4,324,956 A | 4/1982 | Sakakino et al. |
| 4,345,119 A | 8/1982 | Latasiewicz |
| 4,364,674 A | 12/1982 | Tesch |
| 4,379,642 A | 4/1983 | Meyrat |
| 4,395,134 A | 7/1983 | Luce |
| 4,396,298 A | 8/1983 | Ripley |
| 4,417,824 A | 11/1983 | Paterson et al. |
| 4,448,199 A | 5/1984 | Schmid |
| 4,520,306 A | 5/1985 | Kirby |
| 4,581,509 A | 4/1986 | Sanford et al. |
| 4,600,316 A | 7/1986 | Besson |
| 4,617,461 A | 10/1986 | Subbarao et al. |
| 4,634,861 A | 1/1987 | Ching et al. |
| 4,641,026 A | 2/1987 | Garcia, Jr. |
| 4,670,737 A | 6/1987 | Rilling |
| 4,766,642 A | 8/1988 | Gaffney et al. |
| 4,783,772 A | 11/1988 | Umemoto et al. |
| 4,884,073 A | 11/1989 | Souloumiac |
| 4,914,831 A | 4/1990 | Kanezashi et al. |
| 4,922,070 A | 5/1990 | Dorkinski |
| 4,931,794 A | 6/1990 | Haag |
| 4,952,799 A | 8/1990 | Loewen |
| 4,980,685 A | 12/1990 | Souloumiac et al. |
| 4,987,299 A | 1/1991 | Kobayashi et al. |
| 5,034,602 A | 7/1991 | Garcia et al. |
| 5,177,355 A | 1/1993 | Branan |
| 5,214,278 A | 5/1993 | Banda |
| 5,258,592 A | 11/1993 | Nishikawa et al. |
| 5,288,993 A | 2/1994 | Bidiville et al. |
| 5,347,123 A | 9/1994 | Jackson et al. |
| 5,383,166 A | 1/1995 | Gallay |
| 5,471,054 A | 11/1995 | Watanabe |
| 5,477,508 A | 12/1995 | Will |
| 5,509,174 A | 4/1996 | Worrell |
| 5,559,761 A | 9/1996 | Frenkel et al. |
| 5,572,314 A | 11/1996 | Hyman et al. |
| 5,583,560 A | 12/1996 | Florin et al. |
| 5,631,881 A | 5/1997 | Pessey et al. |
| 5,726,645 A | 3/1998 | Kamon et al. |
| 5,738,104 A | 4/1998 | Lo |
| 5,748,111 A | 5/1998 | Bates |
| 5,825,353 A | 10/1998 | Will |
| 5,841,050 A | 11/1998 | Clift et al. |
| 5,847,335 A | 12/1998 | Sugahara et al. |
| 5,867,082 A | 2/1999 | Van Zeeland |
| 5,943,233 A | 8/1999 | Ebina |
| 5,953,001 A | 9/1999 | Challener et al. |
| 5,960,366 A | 9/1999 | Duwaer et al. |
| 5,963,332 A | 10/1999 | Feldman et al. |
| 5,999,168 A | 12/1999 | Rosenberg et al. |
| 6,069,567 A | 5/2000 | Zawilski |
| 6,128,006 A | 10/2000 | Rosenberg et al. |
| 6,134,189 A | 10/2000 | Carrard |
| 6,154,201 A | 11/2000 | Levin et al. |
| 6,175,679 B1 | 1/2001 | Veligdan et al. |
| 6,203,190 B1 | 3/2001 | Stotz |
| 6,241,684 B1 | 6/2001 | Amano |
| 6,246,050 B1 | 6/2001 | Tullis et al. |
| 6,252,825 B1 | 6/2001 | Perotto |
| 6,304,247 B1 | 10/2001 | Black |
| 6,355,891 B1 | 3/2002 | Ikunami |
| 6,361,502 B1 | 3/2002 | Puolakanaho et al. |
| 6,377,239 B1 | 4/2002 | Isikawa |
| 6,392,640 B1 | 5/2002 | Will |
| 6,396,006 B1 | 5/2002 | Yokoji et al. |
| 6,422,740 B1 | 7/2002 | Leuenberger |
| 6,477,117 B1 | 11/2002 | Narayanaswami et al. |
| 6,502,982 B1 | 1/2003 | Bach et al. |
| 6,525,278 B2 | 2/2003 | Villain et al. |
| 6,556,222 B1 | 4/2003 | Narayanaswami |
| 6,575,618 B1 | 6/2003 | Inoue et al. |
| 6,587,400 B1 | 7/2003 | Line |
| 6,636,197 B1 | 10/2003 | Goldenberg et al. |
| 6,646,635 B2 | 11/2003 | Pogatetz et al. |
| 6,661,438 B1 | 11/2003 | Shiraishi et al. |
| 6,672,758 B2 | 1/2004 | Ehrsam et al. |
| 6,721,540 B1 | 4/2004 | Hayakawa |
| 6,794,992 B1 | 9/2004 | Rogers |
| 6,809,275 B1 | 10/2004 | Cheng et al. |
| 6,834,430 B2 | 12/2004 | Worrell |
| 6,846,998 B2 | 1/2005 | Hasumi et al. |
| 6,882,596 B2 | 4/2005 | Guanter et al. |
| 6,888,076 B2 | 5/2005 | Hetherington |
| 6,896,403 B1 | 5/2005 | Gau |
| 6,909,378 B1 | 6/2005 | Lambrechts et al. |
| 6,914,551 B2 | 7/2005 | Vidal |
| 6,950,695 B2 * | 9/2005 | Chen ............... A61B 5/681 |
| | | 600/509 |
| 6,961,099 B2 | 11/2005 | Takano et al. |
| 6,963,039 B1 | 11/2005 | Weng et al. |
| 6,967,903 B2 | 11/2005 | Guanter |
| 6,977,868 B2 | 12/2005 | Brewer et al. |
| 6,982,930 B1 | 1/2006 | Hung |
| 6,985,107 B2 | 1/2006 | Anson |
| 6,987,568 B2 | 1/2006 | Dana |
| 6,998,553 B2 | 2/2006 | Hisamune et al. |
| 7,009,915 B2 | 3/2006 | Brewer et al. |
| 7,016,263 B2 | 3/2006 | Gueissaz et al. |
| 7,021,442 B2 | 4/2006 | Borgerson |
| 7,031,228 B2 | 4/2006 | Born et al. |
| 7,034,237 B2 | 4/2006 | Ferri et al. |
| 7,081,905 B1 | 7/2006 | Raghunath et al. |
| 7,102,626 B2 | 9/2006 | Denny, III |
| 7,111,365 B2 | 9/2006 | Howie, Jr. |
| 7,113,450 B2 | 9/2006 | Plancon et al. |
| 7,119,289 B2 | 10/2006 | Lacroix |
| 7,135,673 B2 | 11/2006 | Saint Clair |
| 7,167,083 B2 | 1/2007 | Giles |
| 7,187,359 B2 | 3/2007 | Numata |
| 7,244,927 B2 | 7/2007 | Huynh |
| 7,255,473 B2 | 8/2007 | Hiranuma et al. |
| 7,265,336 B2 | 9/2007 | Hataguchi et al. |
| 7,274,303 B2 | 9/2007 | Dresti et al. |
| 7,285,738 B2 | 10/2007 | Lavigne et al. |
| 7,286,063 B2 | 10/2007 | Gauthey |
| 7,292,741 B2 | 11/2007 | Ishiyama et al. |
| 7,358,481 B2 | 4/2008 | Yeoh et al. |
| 7,369,308 B2 | 5/2008 | Tsuruta et al. |
| 7,371,745 B2 | 5/2008 | Ebright et al. |
| 7,385,874 B2 | 6/2008 | Vuilleumier |
| 7,404,667 B2 | 7/2008 | Born et al. |
| 7,465,917 B2 | 12/2008 | Chin et al. |
| 7,468,036 B1 | 12/2008 | Rulkov et al. |
| 7,474,592 B2 | 1/2009 | Lyon |
| 7,506,269 B2 | 3/2009 | Lang et al. |

(56) References Cited

U.S. PATENT DOCUMENTS

| | | |
|---|---|---|
| 7,520,664 B2 | 4/2009 | Wai |
| 7,528,824 B2 | 5/2009 | Kong |
| 7,545,367 B2 | 6/2009 | Sunda et al. |
| 7,591,582 B2 | 9/2009 | Hiranuma et al. |
| 7,593,755 B2 | 9/2009 | Colando et al. |
| 7,605,846 B2 | 10/2009 | Watanabe |
| 7,634,263 B2 | 12/2009 | Louch et al. |
| 7,646,677 B2 | 1/2010 | Nakamura |
| 7,655,874 B2 | 2/2010 | Akieda |
| 7,682,070 B2 | 3/2010 | Burton |
| 7,708,457 B2 | 5/2010 | Girardin |
| 7,710,456 B2 | 5/2010 | Koshiba et al. |
| 7,732,724 B2 | 6/2010 | Otani et al. |
| 7,761,246 B2 | 7/2010 | Matsui |
| 7,763,819 B2 | 7/2010 | Ieda et al. |
| 7,772,507 B2 | 8/2010 | Orr |
| 7,778,115 B2 | 8/2010 | Ruchonnet |
| 7,781,726 B2 | 8/2010 | Matsui et al. |
| RE41,637 E | 9/2010 | O'Hara et al. |
| 7,791,587 B2 | 9/2010 | Kosugi |
| 7,791,588 B2 | 9/2010 | Tierling et al. |
| 7,791,597 B2 | 9/2010 | Silverstein et al. |
| 7,822,469 B2 | 10/2010 | Lo |
| 7,856,255 B2 | 12/2010 | Tsuchiya et al. |
| 7,858,583 B2 | 12/2010 | Schmidt et al. |
| 7,865,324 B2 | 1/2011 | Lindberg |
| 7,894,957 B2 | 2/2011 | Carlson |
| 7,946,758 B2 | 5/2011 | Mooring |
| 8,063,892 B2 | 11/2011 | Shahoian et al. |
| 8,138,488 B2 | 3/2012 | Grot |
| 8,143,981 B2 | 3/2012 | Washizu et al. |
| 8,167,126 B2 | 5/2012 | Stiehl |
| 8,169,402 B2 | 5/2012 | Shahoian et al. |
| 8,188,989 B2 | 5/2012 | Levin et al. |
| 8,195,313 B1 | 6/2012 | Fadell et al. |
| 8,229,535 B2 | 7/2012 | Mensinger et al. |
| 8,248,815 B2 | 8/2012 | Yang et al. |
| 8,263,886 B2 | 9/2012 | Lin et al. |
| 8,263,889 B2 | 9/2012 | Takahashi et al. |
| 8,275,327 B2 | 9/2012 | Yi et al. |
| 8,294,670 B2 | 10/2012 | Griffin et al. |
| 8,312,495 B2 | 11/2012 | Vanderhoff |
| 8,318,340 B2 | 11/2012 | Stimits |
| 8,368,677 B2 | 2/2013 | Yamamoto |
| 8,371,745 B2 | 2/2013 | Manni |
| 8,373,661 B2 | 2/2013 | Lan et al. |
| 8,405,618 B2 | 3/2013 | Colgate |
| 8,410,971 B2 | 4/2013 | Friedlander |
| 8,432,368 B2 | 4/2013 | Momeyer et al. |
| 8,439,559 B2 | 5/2013 | Luk et al. |
| 8,441,450 B2 | 5/2013 | Degner et al. |
| 8,446,713 B2 | 5/2013 | Lai |
| 8,456,430 B2 | 6/2013 | Oliver et al. |
| 8,477,118 B2 | 7/2013 | Lan et al. |
| 8,493,190 B2 | 7/2013 | Periquet et al. |
| 8,508,511 B2 | 8/2013 | Tanaka et al. |
| 8,525,777 B2 | 9/2013 | Stavely et al. |
| 8,562,489 B2 | 10/2013 | Burton et al. |
| 8,568,313 B2 | 10/2013 | Sadhu |
| 8,576,044 B2 | 11/2013 | Chapman |
| 8,593,598 B2 | 11/2013 | Chen et al. |
| 8,607,662 B2 | 12/2013 | Huang |
| 8,614,881 B2 | 12/2013 | Yoo |
| 8,666,682 B2 | 3/2014 | LaVigne et al. |
| 8,677,285 B2 | 3/2014 | Tsern et al. |
| 8,704,787 B2 | 4/2014 | Yamamoto |
| 8,711,093 B2 | 4/2014 | Ong et al. |
| 8,717,151 B2 | 5/2014 | Forutanpour et al. |
| 8,724,087 B2 | 5/2014 | Van De Kerkhof et al. |
| 8,730,167 B2 | 5/2014 | Ming et al. |
| 8,743,088 B2 | 6/2014 | Watanabe |
| 8,783,944 B2 | 7/2014 | Doi |
| 8,797,153 B2 | 8/2014 | Vanhelle et al. |
| 8,804,993 B2 | 8/2014 | Shukla et al. |
| 8,816,962 B2 | 8/2014 | Obermeyer et al. |
| 8,824,245 B2 | 9/2014 | Lau et al. |
| 8,847,741 B2 | 9/2014 | Birnbaum et al. |
| 8,851,372 B2 | 10/2014 | Zhou |
| 8,859,971 B2 | 10/2014 | Weber |
| 8,860,674 B2 | 10/2014 | Lee et al. |
| 8,863,219 B2 | 10/2014 | Brown et al. |
| D717,679 S | 11/2014 | Anderssen |
| 8,878,657 B2 | 11/2014 | Periquet et al. |
| 8,885,856 B2 | 11/2014 | Sacha |
| 8,895,911 B2 | 11/2014 | Takahashi |
| 8,905,631 B2 | 12/2014 | Sakurazawa et al. |
| 8,908,477 B2 | 12/2014 | Peters |
| 8,920,022 B2 | 12/2014 | Ishida et al. |
| 8,922,399 B2 | 12/2014 | Bajaj et al. |
| 8,928,452 B2 | 1/2015 | Kim et al. |
| 8,948,832 B2 | 2/2015 | Hong et al. |
| 8,954,135 B2 | 2/2015 | Yuen et al. |
| 8,975,543 B2 | 3/2015 | Hakemeyer |
| 8,994,827 B2 | 3/2015 | Mistry et al. |
| 9,001,625 B2 | 4/2015 | Essery et al. |
| 9,024,733 B2 | 5/2015 | Wouters |
| 9,028,134 B2 | 5/2015 | Koshoji et al. |
| 9,030,446 B2 | 5/2015 | Mistry et al. |
| 9,034,666 B2 | 5/2015 | Vaganov et al. |
| 9,039,614 B2 | 5/2015 | Yuen et al. |
| 9,041,663 B2 | 5/2015 | Westerman |
| 9,042,971 B2 | 5/2015 | Brumback et al. |
| 9,049,998 B2 | 6/2015 | Brumback et al. |
| 9,052,696 B2 | 6/2015 | Breuillot et al. |
| 9,086,717 B2 | 7/2015 | Meerovitsch |
| 9,086,738 B2 | 7/2015 | Leung et al. |
| 9,091,309 B2 | 7/2015 | Battlogg |
| 9,100,493 B1 | 8/2015 | Zhou |
| 9,101,184 B2 | 8/2015 | Wilson |
| 9,105,413 B2 | 8/2015 | Hiranuma et al. |
| 9,123,483 B2 | 9/2015 | Ferri et al. |
| 9,134,807 B2 | 9/2015 | Shaw et al. |
| 9,141,087 B2 | 9/2015 | Brown et al. |
| 9,176,577 B2 | 11/2015 | Jangaard et al. |
| 9,176,598 B2 | 11/2015 | Sweetser et al. |
| 9,202,372 B2 | 12/2015 | Reams et al. |
| 9,213,409 B2 | 12/2015 | Redelsheimer et al. |
| 9,223,296 B2 | 12/2015 | Yang et al. |
| 9,241,635 B2 | 1/2016 | Yuen et al. |
| 9,244,438 B2 | 1/2016 | Hoover et al. |
| 9,256,209 B2 | 2/2016 | Yang et al. |
| 9,277,156 B2 | 3/2016 | Bennett et al. |
| 9,350,850 B2 | 5/2016 | Pope et al. |
| 9,367,146 B2 | 6/2016 | Piot |
| 9,386,932 B2 | 7/2016 | Chatterjee et al. |
| 9,426,275 B2 | 8/2016 | Eim et al. |
| 9,430,042 B2 | 8/2016 | Levin |
| 9,437,357 B2 | 9/2016 | Furuki et al. |
| 9,449,770 B2 | 9/2016 | Sanford et al. |
| 9,501,044 B2 | 11/2016 | Jackson et al. |
| 9,520,100 B2 | 12/2016 | Houjou et al. |
| 9,532,723 B2 | 1/2017 | Kim |
| 9,542,016 B2 | 1/2017 | Armstrong-Muntner |
| 9,545,541 B2 | 1/2017 | Aragones et al. |
| 9,552,023 B2 | 1/2017 | Joo et al. |
| 9,599,964 B2 | 3/2017 | Gracia |
| 9,600,071 B2 | 3/2017 | Rothkopf |
| 9,607,505 B2 | 3/2017 | Rothkopf et al. |
| 9,620,312 B2 | 4/2017 | Ely et al. |
| 9,627,163 B2 | 4/2017 | Ely |
| 9,632,318 B2 | 4/2017 | Goto et al. |
| 9,632,537 B2 | 4/2017 | Memering |
| 9,638,587 B2 | 5/2017 | Marquas et al. |
| 9,651,922 B2 | 5/2017 | Hysek et al. |
| 9,659,482 B2 | 5/2017 | Yang et al. |
| 9,680,831 B2 | 6/2017 | Jooste et al. |
| 9,709,956 B1 | 7/2017 | Ely et al. |
| 9,753,436 B2 | 9/2017 | Ely et al. |
| D800,172 S | 10/2017 | Akana |
| 9,800,717 B2 | 10/2017 | Ma et al. |
| 9,836,025 B2 | 12/2017 | Ely et al. |
| 9,873,711 B2 | 1/2018 | Hoover et al. |
| 9,874,945 B2 | 1/2018 | Fukumoto |
| 9,886,006 B2 | 2/2018 | Ely et al. |

(56) References Cited

U.S. PATENT DOCUMENTS

| | | | |
|---|---|---|---|
| 9,891,590 | B2 | 2/2018 | Shim et al. |
| 9,891,651 | B2 | 2/2018 | Jackson et al. |
| 9,891,667 | B2 | 2/2018 | Jung et al. |
| 9,898,032 | B2 | 2/2018 | Hafez et al. |
| 9,913,591 | B2 * | 3/2018 | Lapetina ............ A61B 5/0059 |
| 9,921,548 | B2 | 3/2018 | Mitani |
| 9,927,902 | B2 | 3/2018 | Burr et al. |
| 9,939,923 | B2 | 4/2018 | Sharma |
| 9,946,297 | B2 | 4/2018 | Nazzaro et al. |
| 9,952,558 | B2 | 4/2018 | Ely |
| 9,952,682 | B2 | 4/2018 | Zhang et al. |
| 9,971,305 | B2 | 5/2018 | Ely et al. |
| 9,971,405 | B2 | 5/2018 | Holenarsipur et al. |
| 9,971,407 | B2 | 5/2018 | Holenarsipur et al. |
| 9,979,426 | B2 | 5/2018 | Na et al. |
| 10,001,817 | B2 | 6/2018 | Zambetti et al. |
| 10,012,550 | B2 | 7/2018 | Yang |
| 10,018,966 | B2 | 7/2018 | Ely et al. |
| 10,019,097 | B2 | 7/2018 | Ely et al. |
| 10,037,006 | B2 | 7/2018 | Ely |
| 10,037,081 | B2 | 7/2018 | Grant |
| 10,048,802 | B2 | 8/2018 | Shedletsky |
| 10,057,470 | B2 | 8/2018 | Kim et al. |
| 10,060,788 | B2 | 8/2018 | Fei |
| 10,061,399 | B2 | 8/2018 | Bushnell et al. |
| 10,066,970 | B2 | 9/2018 | Gowreesunker et al. |
| 10,092,203 | B2 | 10/2018 | Mirov |
| 10,108,016 | B2 | 10/2018 | Bosveld |
| 10,114,342 | B2 | 10/2018 | Kim et al. |
| 10,145,711 | B2 | 12/2018 | Boonsom et al. |
| 10,175,652 | B2 | 1/2019 | Ely et al. |
| 10,190,891 | B1 | 1/2019 | Rothkopf et al. |
| 10,191,455 | B2 * | 1/2019 | Shim ..................... G04G 21/08 |
| 10,203,662 | B1 | 2/2019 | Lin et al. |
| 10,209,148 | B2 | 2/2019 | Lyon et al. |
| 10,222,755 | B2 | 3/2019 | Coakley et al. |
| 10,222,909 | B2 | 3/2019 | Shedletsky et al. |
| 10,241,593 | B2 | 3/2019 | Chen |
| 10,296,125 | B2 | 5/2019 | Ely et al. |
| 10,331,081 | B2 | 6/2019 | Ely |
| 10,331,082 | B2 | 6/2019 | Ely et al. |
| 10,332,111 | B2 | 6/2019 | Mokhasi et al. |
| 10,353,487 | B2 | 7/2019 | Chung et al. |
| 10,379,629 | B2 | 8/2019 | Bushnell et al. |
| 10,386,940 | B2 | 8/2019 | Kim |
| 10,401,961 | B2 | 9/2019 | Cruz-Hernandez et al. |
| 10,429,959 | B2 | 10/2019 | Battlogg |
| 10,474,194 | B1 | 11/2019 | Ell et al. |
| 10,503,258 | B2 | 12/2019 | Holenarsipur et al. |
| 10,509,486 | B2 | 12/2019 | Bushnell et al. |
| 10,524,671 | B2 | 1/2020 | Lamego |
| 10,534,320 | B2 | 1/2020 | Ferri et al. |
| 10,551,798 | B1 | 2/2020 | Bushnell et al. |
| 10,572,053 | B2 | 2/2020 | Ely et al. |
| 10,593,617 | B2 | 3/2020 | Ashikaga et al. |
| 10,599,101 | B2 | 3/2020 | Rothkopf et al. |
| 10,610,157 | B2 | 4/2020 | Pandya et al. |
| 10,765,019 | B2 | 9/2020 | Werner |
| 10,840,041 | B1 * | 11/2020 | Harms ..................... G05G 5/04 |
| 10,845,764 | B2 | 11/2020 | Ely et al. |
| 10,852,700 | B2 | 12/2020 | Abramov |
| 10,852,855 | B2 | 12/2020 | Niu |
| 10,871,385 | B2 | 12/2020 | Kok |
| 10,884,549 | B2 | 1/2021 | Shedletsky et al. |
| 10,936,071 | B2 | 3/2021 | Pandya et al. |
| 10,942,491 | B2 | 3/2021 | Rothkopf |
| 10,948,880 | B2 | 3/2021 | Ely et al. |
| 10,955,937 | B2 | 3/2021 | Bushnell et al. |
| 10,987,054 | B2 | 4/2021 | Pandya et al. |
| 11,000,193 | B2 | 5/2021 | Tal et al. |
| 11,029,831 | B2 | 6/2021 | Block et al. |
| 11,036,318 | B2 | 6/2021 | Bokma et al. |
| 11,148,292 | B2 | 10/2021 | Bryner et al. |
| 11,181,863 | B2 | 11/2021 | Ely et al. |
| 11,194,298 | B2 | 12/2021 | Roach et al. |
| 11,221,590 | B2 | 1/2022 | Rothkopf et al. |
| 11,347,189 | B1 | 5/2022 | Herrera et al. |
| 11,360,440 | B2 | 6/2022 | Perkins et al. |
| 11,385,599 | B2 | 7/2022 | Ely et al. |
| 11,474,483 | B2 | 10/2022 | Rothkopf |
| 11,531,306 | B2 | 12/2022 | Ely et al. |
| 11,567,457 | B2 | 1/2023 | Rothkopf et al. |
| 11,669,205 | B2 | 6/2023 | Shedletsky et al. |
| 11,796,961 | B2 | 10/2023 | Ely et al. |
| 2002/0101457 | A1 | 8/2002 | Lang |
| 2003/0174590 | A1 | 9/2003 | Arikawa et al. |
| 2004/0047244 | A1 | 3/2004 | Iino et al. |
| 2004/0082414 | A1 | 4/2004 | Knox |
| 2004/0130971 | A1 | 7/2004 | Ecoffet et al. |
| 2004/0264301 | A1 | 12/2004 | Howard et al. |
| 2005/0075558 | A1 | 4/2005 | Vecerina et al. |
| 2005/0088417 | A1 | 4/2005 | Mulligan |
| 2006/0250377 | A1 | 11/2006 | Zadesky et al. |
| 2007/0013775 | A1 | 1/2007 | Shin |
| 2007/0050054 | A1 | 3/2007 | Sambandam Guruparan et al. |
| 2007/0182708 | A1 | 8/2007 | Poupyrev et al. |
| 2007/0211042 | A1 | 9/2007 | Kim et al. |
| 2007/0222756 | A1 | 9/2007 | Wu et al. |
| 2007/0229671 | A1 | 10/2007 | Takeshita et al. |
| 2007/0242569 | A1 | 10/2007 | Inoue |
| 2007/0247421 | A1 | 10/2007 | Orsley et al. |
| 2008/0130914 | A1 | 6/2008 | Cho |
| 2009/0051649 | A1 | 2/2009 | Rondel |
| 2009/0073119 | A1 | 3/2009 | Le et al. |
| 2009/0122656 | A1 | 5/2009 | Bonnet et al. |
| 2009/0146975 | A1 | 6/2009 | Chang |
| 2009/0152452 | A1 | 6/2009 | Lee et al. |
| 2009/0217207 | A1 | 8/2009 | Kagermeier et al. |
| 2009/0285443 | A1 | 11/2009 | Camp et al. |
| 2009/0312051 | A1 | 12/2009 | Hansson et al. |
| 2009/0312655 | A1 * | 12/2009 | Lo ..................... A61B 5/02438 |
| | | | 600/503 |
| 2010/0033430 | A1 | 2/2010 | Kakutani et al. |
| 2010/0053468 | A1 | 3/2010 | Havrill |
| 2010/0081375 | A1 | 4/2010 | Rosenblatt et al. |
| 2010/0149099 | A1 | 6/2010 | Elias |
| 2011/0007468 | A1 | 1/2011 | Burton et al. |
| 2011/0090148 | A1 | 4/2011 | Li et al. |
| 2011/0158057 | A1 | 6/2011 | Brewer et al. |
| 2011/0199301 | A1 * | 8/2011 | Zhao ..................... G06F 3/038 |
| | | | 345/158 |
| 2011/0242064 | A1 | 10/2011 | Ono et al. |
| 2011/0249378 | A1 | 10/2011 | Yoo |
| 2011/0270358 | A1 | 11/2011 | Davis et al. |
| 2012/0067711 | A1 | 3/2012 | Yang |
| 2012/0068857 | A1 | 3/2012 | Rothkopf et al. |
| 2012/0075082 | A1 | 3/2012 | Rothkopf et al. |
| 2012/0112859 | A1 | 5/2012 | Park et al. |
| 2012/0113044 | A1 | 5/2012 | Strazisar et al. |
| 2012/0206248 | A1 | 8/2012 | Biggs |
| 2012/0272784 | A1 | 11/2012 | Bailey et al. |
| 2013/0037396 | A1 | 2/2013 | Yu |
| 2013/0087443 | A1 | 4/2013 | Kikuchi |
| 2013/0191220 | A1 | 7/2013 | Dent et al. |
| 2013/0235704 | A1 | 9/2013 | Grinberg |
| 2013/0261405 | A1 | 10/2013 | Lee et al. |
| 2013/0335196 | A1 | 12/2013 | Zhang et al. |
| 2014/0009397 | A1 | 1/2014 | Gillespie et al. |
| 2014/0045547 | A1 | 2/2014 | Singamsetty et al. |
| 2014/0071098 | A1 | 3/2014 | You |
| 2014/0073486 | A1 | 3/2014 | Ahmed et al. |
| 2014/0132516 | A1 | 5/2014 | Tsai et al. |
| 2014/0143784 | A1 | 5/2014 | Mistry |
| 2014/0197936 | A1 | 7/2014 | Biggs et al. |
| 2014/0340318 | A1 | 11/2014 | Stringer et al. |
| 2014/0347289 | A1 | 11/2014 | Suh et al. |
| 2014/0368442 | A1 | 12/2014 | Vahtola |
| 2014/0375579 | A1 | 12/2014 | Fujiwara |
| 2015/0026647 | A1 | 1/2015 | Park et al. |
| 2015/0049059 | A1 | 2/2015 | Zadesky et al. |
| 2015/0098309 | A1 | 4/2015 | Adams et al. |
| 2015/0124415 | A1 | 5/2015 | Goyal et al. |
| 2015/0186609 | A1 | 7/2015 | Utter, II |
| 2015/0221460 | A1 | 8/2015 | Teplitxky et al. |

(56) References Cited

U.S. PATENT DOCUMENTS

| | | |
|---|---|---|
| 2015/0293592 A1 | 10/2015 | Cheong et al. |
| 2015/0320346 A1 | 11/2015 | Chen |
| 2015/0338642 A1 | 11/2015 | Sanford |
| 2015/0341031 A1* | 11/2015 | Marquas ............ H01G 5/0136 200/600 |
| 2015/0366098 A1 | 12/2015 | Lapetina et al. |
| 2016/0018846 A1 | 1/2016 | Zenoff |
| 2016/0054813 A1 | 2/2016 | Shediwy et al. |
| 2016/0058375 A1 | 3/2016 | Rothkopf et al. |
| 2016/0061636 A1 | 3/2016 | Gowreesunker et al. |
| 2016/0062623 A1 | 3/2016 | Howard et al. |
| 2016/0069713 A1 | 3/2016 | Ruh et al. |
| 2016/0109861 A1 | 4/2016 | Kim et al. |
| 2016/0116306 A1 | 4/2016 | Ferri et al. |
| 2016/0147432 A1 | 5/2016 | Shi et al. |
| 2016/0170598 A1 | 6/2016 | Zambetti et al. |
| 2016/0170608 A1 | 6/2016 | Zambetti et al. |
| 2016/0170624 A1 | 6/2016 | Zambetti et al. |
| 2016/0241688 A1 | 8/2016 | Vossoughi |
| 2016/0253487 A1 | 9/2016 | Sarkar et al. |
| 2016/0306446 A1 | 10/2016 | Chung et al. |
| 2016/0320583 A1 | 11/2016 | Hall, Jr. |
| 2016/0327911 A1* | 11/2016 | Eim ........................ G06F 3/041 |
| 2016/0338642 A1 | 11/2016 | Parara et al. |
| 2016/0378069 A1 | 12/2016 | Rothkopf et al. |
| 2016/0378070 A1 | 12/2016 | Rothkopf et al. |
| 2016/0378071 A1 | 12/2016 | Rothkopf et al. |
| 2017/0011210 A1 | 1/2017 | Cheong et al. |
| 2017/0027461 A1 | 2/2017 | Shin et al. |
| 2017/0031449 A1 | 2/2017 | Karsten et al. |
| 2017/0045958 A1 | 2/2017 | Battlogg et al. |
| 2017/0061863 A1 | 3/2017 | Eguchi |
| 2017/0069443 A1 | 3/2017 | Wang et al. |
| 2017/0069444 A1 | 3/2017 | Wang et al. |
| 2017/0069447 A1 | 3/2017 | Wang et al. |
| 2017/0089735 A1 | 3/2017 | Ruh |
| 2017/0090599 A1 | 3/2017 | Kuboyama |
| 2017/0104902 A1 | 4/2017 | Kim et al. |
| 2017/0139489 A1 | 5/2017 | Chen et al. |
| 2017/0216519 A1 | 8/2017 | Vouillamoz |
| 2017/0216668 A1 | 8/2017 | Burton et al. |
| 2017/0238138 A1 | 8/2017 | Aminzade |
| 2017/0251561 A1 | 8/2017 | Fleck et al. |
| 2017/0269715 A1 | 9/2017 | Kim et al. |
| 2017/0285404 A1 | 10/2017 | Kubota et al. |
| 2017/0301314 A1 | 10/2017 | Kim et al. |
| 2017/0307414 A1 | 10/2017 | Ferri et al. |
| 2017/0319082 A1* | 11/2017 | Sayme .................... A61B 5/316 |
| 2017/0331869 A1 | 11/2017 | Bendahan et al. |
| 2017/0357465 A1 | 12/2017 | Dzeryn et al. |
| 2018/0018026 A1 | 1/2018 | Bushnell et al. |
| 2018/0059624 A1 | 3/2018 | James |
| 2018/0136613 A1 | 5/2018 | Ely et al. |
| 2018/0136686 A1 | 5/2018 | Jackson et al. |
| 2018/0196517 A1 | 7/2018 | Tan et al. |
| 2018/0225701 A1 | 8/2018 | Han |
| 2018/0235491 A1 | 8/2018 | Bayley et al. |
| 2018/0239306 A1 | 8/2018 | Ely |
| 2018/0299834 A1 | 10/2018 | Ely et al. |
| 2018/0307363 A1 | 10/2018 | Ely et al. |
| 2018/0329368 A1 | 11/2018 | Ely et al. |
| 2018/0335891 A1 | 11/2018 | Shedletsky et al. |
| 2018/0337551 A1 | 11/2018 | Park et al. |
| 2018/0341342 A1 | 11/2018 | Bushnell et al. |
| 2018/0364815 A1 | 12/2018 | Moussette et al. |
| 2019/0017846 A1 | 1/2019 | Boonsom et al. |
| 2019/0025940 A1 | 1/2019 | Shim et al. |
| 2019/0056700 A1 | 2/2019 | Matsuno |
| 2019/0059756 A1* | 2/2019 | Rasmussen ............ A61B 5/339 |
| 2019/0072911 A1 | 3/2019 | Ely et al. |
| 2019/0072912 A1 | 3/2019 | Pandya et al. |
| 2019/0088583 A1* | 3/2019 | Ashikaga .......... H01L 23/49838 |
| 2019/0163324 A1 | 5/2019 | Shedletsky |
| 2019/0278232 A1 | 9/2019 | Ely et al. |
| 2019/0294117 A1 | 9/2019 | Ely et al. |
| 2019/0317454 A1 | 10/2019 | Holenarsipur et al. |
| 2019/0391539 A1 | 12/2019 | Perkins et al. |
| 2020/0064774 A1 | 2/2020 | Ely et al. |
| 2020/0085331 A1* | 3/2020 | Chou ..................... A61B 5/291 |
| 2020/0110473 A1 | 4/2020 | Bushnell et al. |
| 2020/0150815 A1 | 5/2020 | Ely et al. |
| 2020/0233380 A1 | 7/2020 | Rothkopf |
| 2020/0310609 A1 | 10/2020 | Ham |
| 2021/0157278 A1* | 5/2021 | Xue ....................... G06F 1/163 |
| 2021/0181682 A1 | 6/2021 | Ely et al. |
| 2021/0181688 A1 | 6/2021 | Ely et al. |
| 2021/0181690 A1 | 6/2021 | Rothkopf et al. |
| 2021/0181691 A1 | 6/2021 | Rothkopf et al. |
| 2021/0181692 A1 | 6/2021 | Rothkopf et al. |
| 2021/0181865 A1 | 6/2021 | Bushnell et al. |
| 2021/0255590 A1 | 8/2021 | Ely et al. |
| 2021/0303081 A1 | 9/2021 | Kuboyama et al. |
| 2021/0353226 A1 | 11/2021 | Hiemstra |
| 2021/0405594 A1 | 12/2021 | Holenarsipur et al. |
| 2022/0043397 A1 | 2/2022 | Ely et al. |
| 2022/0043402 A1 | 2/2022 | Roach et al. |
| 2022/0171344 A1 | 6/2022 | Rothkopf et al. |
| 2022/0261111 A1 | 8/2022 | Shedletsky et al. |
| 2022/0299944 A1 | 9/2022 | Ely |
| 2022/0326660 A1 | 10/2022 | Perkins |
| 2022/0413446 A1 | 12/2022 | Rothkopf |
| 2023/0012897 A1 | 1/2023 | Bushnell |
| 2023/0013283 A1 | 1/2023 | Herrera |
| 2023/0028554 A1 | 1/2023 | Rothkopf |
| 2023/0097827 A1 | 3/2023 | Rothkopf et al. |
| 2023/0101015 A1 | 3/2023 | Ely et al. |
| 2023/0161299 A1 | 5/2023 | Beyhs |
| 2023/0213893 A1 | 7/2023 | Rothkopf et al. |
| 2023/0259235 A1 | 8/2023 | Shedletsky et al. |
| 2023/0341819 A1 | 10/2023 | Ely et al. |

FOREIGN PATENT DOCUMENTS

| | | |
|---|---|---|
| CN | 1445627 | 10/2003 |
| CN | 1504843 | 6/2004 |
| CN | 1601408 | 3/2005 |
| CN | 1624427 | 6/2005 |
| CN | 1792295 | 6/2006 |
| CN | 1825224 | 8/2006 |
| CN | 101035148 | 9/2007 |
| CN | 101201587 | 6/2008 |
| CN | 201081979 | 7/2008 |
| CN | 101404928 | 4/2009 |
| CN | 201262741 | 6/2009 |
| CN | 101750958 | 6/2010 |
| CN | 201638168 | 11/2010 |
| CN | 101923314 | 12/2010 |
| CN | 102067070 | 5/2011 |
| CN | 102216959 | 10/2011 |
| CN | 202008579 | 10/2011 |
| CN | 102590925 | 7/2012 |
| CN | 102741772 | 10/2012 |
| CN | 102890443 | 1/2013 |
| CN | 202710937 | 1/2013 |
| CN | 103177891 | 6/2013 |
| CN | 103191557 | 7/2013 |
| CN | 103253067 | 8/2013 |
| CN | 103645804 | 3/2014 |
| CN | 203564224 | 4/2014 |
| CN | 103852090 | 6/2014 |
| CN | 203630524 | 6/2014 |
| CN | 103919536 | 7/2014 |
| CN | 103956006 | 7/2014 |
| CN | 203693601 | 7/2014 |
| CN | 203705837 | 7/2014 |
| CN | 203732900 | 7/2014 |
| CN | 103995456 | 8/2014 |
| CN | 104020660 | 9/2014 |
| CN | 203941395 | 11/2014 |
| CN | 104777987 | 4/2015 |
| CN | 104685794 | 6/2015 |
| CN | 204479929 | 7/2015 |
| CN | 204496177 | 7/2015 |
| CN | 104880937 | 9/2015 |

(56) References Cited

FOREIGN PATENT DOCUMENTS

| | | |
|---|---|---|
| CN | 104898406 | 9/2015 |
| CN | 204650147 | 9/2015 |
| CN | 105022947 | 11/2015 |
| CN | 105096979 | 11/2015 |
| CN | 105339871 | 2/2016 |
| CN | 105547146 | 5/2016 |
| CN | 105556433 | 5/2016 |
| CN | 105683876 | 6/2016 |
| CN | 105760067 | 7/2016 |
| CN | 105955519 | 9/2016 |
| CN | 205645648 | 10/2016 |
| CN | 205721636 | 11/2016 |
| CN | 205750744 | 11/2016 |
| CN | 106236051 | 12/2016 |
| CN | 106557218 | 4/2017 |
| CN | 206147524 | 5/2017 |
| CN | 206209589 | 5/2017 |
| CN | 107111342 | 8/2017 |
| CN | 107122088 | 9/2017 |
| CN | 107966895 | 4/2018 |
| CN | 209560397 | 10/2019 |
| CN | 209625187 | 11/2019 |
| CN | 114220694 | 3/2022 |
| CN | 106125968 | 11/2022 |
| DE | 3706194 | 9/1988 |
| DE | 102008023651 | 11/2009 |
| DE | 102016215087 | 3/2017 |
| EP | 0165548 | 12/1985 |
| EP | 0556155 | 8/1993 |
| EP | 1345095 | 9/2003 |
| EP | 1519452 | 3/2005 |
| EP | 1669724 | 6/2006 |
| EP | 1832969 | 9/2007 |
| EP | 2375295 | 10/2011 |
| EP | 2579186 | 4/2013 |
| EP | 2720129 | 4/2014 |
| EP | 2884239 | 6/2015 |
| FR | 2030093 | 10/1970 |
| FR | 2801402 | 5/2001 |
| GB | 2433211 | 6/2007 |
| JP | S52151058 | 12/1977 |
| JP | S52164551 | 12/1977 |
| JP | S53093067 | 8/1978 |
| JP | S54087779 | 6/1979 |
| JP | S5708582 | 1/1982 |
| JP | S5734457 | 2/1982 |
| JP | S60103936 | 6/1985 |
| JP | S60103937 | 6/1985 |
| JP | H02285214 | 11/1990 |
| JP | H04093719 | 3/1992 |
| JP | H04157319 | 5/1992 |
| JP | H05203465 | 8/1993 |
| JP | H05312595 | 11/1993 |
| JP | H06050927 | 12/1994 |
| JP | H06331761 | 12/1994 |
| JP | H06347293 | 12/1994 |
| JP | H07116141 | 5/1995 |
| JP | H0914941 | 1/1997 |
| JP | H10161811 | 6/1998 |
| JP | H11121210 | 4/1999 |
| JP | H11191508 | 7/1999 |
| JP | 2000258559 | 9/2000 |
| JP | 2000316824 | 11/2000 |
| JP | 2000337892 | 12/2000 |
| JP | 2001084934 | 3/2001 |
| JP | 2001167651 | 6/2001 |
| JP | 2001202178 | 7/2001 |
| JP | 2001215288 | 8/2001 |
| JP | 2001524206 | 11/2001 |
| JP | 2002071480 | 3/2002 |
| JP | 2002165768 | 6/2002 |
| JP | 2003050668 | 2/2003 |
| JP | 2003151410 | 5/2003 |
| JP | 2003331693 | 11/2003 |
| JP | 2004184396 | 7/2004 |
| JP | 2004028979 | 11/2004 |
| JP | 2005017011 | 1/2005 |
| JP | 2005063200 | 3/2005 |
| JP | 2005099023 | 4/2005 |
| JP | 2005108630 | 4/2005 |
| JP | 2006101505 | 4/2006 |
| JP | 2006164275 | 6/2006 |
| JP | 3852854 | 12/2006 |
| JP | 2007101380 | 4/2007 |
| JP | 2007149620 | 6/2007 |
| JP | 2007248176 | 9/2007 |
| JP | 2007285748 | 11/2007 |
| JP | 2007311153 | 11/2007 |
| JP | 2008053980 | 3/2008 |
| JP | 2008122124 | 5/2008 |
| JP | 2008122377 | 5/2008 |
| JP | 2008170436 | 7/2008 |
| JP | 2008235226 | 10/2008 |
| JP | 2009009382 | 1/2009 |
| JP | 2009070657 | 4/2009 |
| JP | 2009519737 | 5/2009 |
| JP | 2009540399 | 11/2009 |
| JP | 2010032545 | 2/2010 |
| JP | 2010515153 | 5/2010 |
| JP | 2010165001 | 7/2010 |
| JP | 2010186572 | 8/2010 |
| JP | 2010243344 | 10/2010 |
| JP | 2010244797 | 10/2010 |
| JP | 2011021929 | 2/2011 |
| JP | 2011165468 | 8/2011 |
| JP | 2011221659 | 11/2011 |
| JP | 2012053801 | 3/2012 |
| JP | 2013057516 | 3/2013 |
| JP | 2013079961 | 5/2013 |
| JP | 2013524189 | 6/2013 |
| JP | 3190075 | 4/2014 |
| JP | 5477393 | 4/2014 |
| JP | 2014512556 | 5/2014 |
| JP | 2014112222 | 6/2014 |
| JP | 2014174031 | 9/2014 |
| JP | 2017219448 | 12/2017 |
| JP | 2018510451 | 4/2018 |
| KR | 20010030477 | 4/2001 |
| KR | 200278568 | 3/2002 |
| KR | 20070011685 | 1/2007 |
| KR | 20070014247 | 2/2007 |
| KR | 100754674 | 9/2007 |
| KR | 20080028935 | 4/2008 |
| KR | 20080045397 | 5/2008 |
| KR | 100849684 | 8/2008 |
| KR | 2020100007563 | 7/2010 |
| KR | 20110011393 | 2/2011 |
| KR | 20110012784 | 2/2011 |
| KR | 20110103761 | 9/2011 |
| KR | 20110113368 | 10/2011 |
| KR | 20130036038 | 4/2013 |
| KR | 20130131873 | 12/2013 |
| KR | 20140051391 | 4/2014 |
| KR | 20140064689 | 5/2014 |
| KR | 20140104388 | 8/2014 |
| KR | 20160017070 | 2/2016 |
| KR | 20160048967 | 5/2016 |
| KR | 1020170106395 | 9/2017 |
| NL | 1040225 | 11/2014 |
| RO | 129033 | 11/2013 |
| TW | 200633681 | 10/2006 |
| WO | WO2001/022038 | 3/2001 |
| WO | WO2001/069567 | 9/2001 |
| WO | WO2003032538 | 4/2003 |
| WO | WO2010/058376 | 5/2010 |
| WO | WO2012/083380 | 6/2012 |
| WO | WO2012/094805 | 7/2012 |
| WO | WO2014/018118 | 1/2014 |
| WO | WO2014/200766 | 12/2014 |
| WO | WO2015/147756 | 10/2015 |
| WO | WO2016080669 | 5/2016 |
| WO | WO2016/104922 | 6/2016 |
| WO | WO2016/155761 | 10/2016 |
| WO | WO2016196171 | 12/2016 |

(56) References Cited

FOREIGN PATENT DOCUMENTS

| WO | WO2016208835 | 12/2016 |
| WO | WO2017/013278 | 1/2017 |
| WO | WO2020173085 | 9/2020 |

OTHER PUBLICATIONS

M.T. Raghunath et al., User Interfaces for Applications on a Wrist Watch, Personal and Ubiquitous Computing, vol. 6, No. 1, 2002, Springer.

Author Unknown, "Desirable Android Wear smartwatch from LG," Gulf News, Dubai, 3 pages, Jan. 30, 2015.

Author Unknown, "Fossil Q ups smartwatch game with handsome design and build," Business Mirror, Makati City, Philippines, 3 pages, Dec. 20, 2016.

Author Unknown, "How Vesag Helps Kids Women and Visitors," http://www.sooperarticles.com/health-fitness-articles/children-health-articles/how-vesag-helps-kids-women-visitors-218542.html, 2 pages, at least as early as May 20, 2015.

Author Unknown, "mHealth," http://mhealth.vesag.com/?m=201012, 7 pages, Dec. 23, 2010.

Author Unknown, "mHealth Summit 2010," http://www.virtualpressoffice.com/eventsSubmenu.do?page=exhibitorPage&showId=1551&companyId=5394, 5 pages, Nov. 18, 2010.

Author Unknown, "MyKronoz ZeTime: World's Most Funded Hybrid Smartwatch Raised over $3M on Kickstarter, Running until Apr. 27th," Business Wire, New York, New York, 3 pages, Apr. 21, 2017.

Author Unknown, "RedEye mini Plug-in Universal Remote Adapter for iPhone, iPod touch and iPad," Amazon.com, 4 pages, date unknown.

Author Unknown, "Re iPhone Universal Remote Control—Infrared Remote Control Accessory for iphone and ipod touch," http://www.amazon.com/iPhone-Universal-Remote-Control-Accessory/dp/tech-data/B0038Z4 . . . , 2 pages, at least as early as Jul. 15, 2010.

Author Unknown, "Vesag Wrist Watch for Dementia Care from VYZIN," http://vyasa-kaaranam-ketkadey.blogspot.com/2011/03/vesag-wrist-watch-for-dementia-care.html, 2 pages, Mar. 31, 2011.

Author Unknown, "Vyzin Electronics Private Limited launches Vesag Watch," http://www.virtualpressoffice.com/showJointPage.do?page=jp&showId=1544, 5 pages, Jan. 6, 2011.

Author Unknown, "Vyzin Unveiled Personal Emergency Response System (PERS) with Remote Health Monitoring That Can Be Used for Entire Family," http://www.24-7pressrelease.com/press-release/vyzin-unveiled-personal-emergency-response-system-pers-with-remote-health-monitoring-that-can-be-used-for-entire-family-219317.php, 2 pages, Jun. 17, 2011.

Author Unknown, "DeskThorityNet, Optical Switch Keyboards," http://deskthority.net/keyboards-f2/optical-switch-keyboards-t1474.html, 22 pages, Jul. 11, 2015.

Epstein et al., "Economical, High-Performance Optical Encoders," Hewlett-Packard Journal, pp. 99-106, Oct. 1988. [text only version].

GreyB, "Google Watch: Convert your arm into a keyboard," http://www.whatafuture.com/2014/02/28/google-smartwatch/#sthash.Yk35cDXK.dpbs, 3 pages, Feb. 28, 2014.

IBM, "Additional Functionality Added to Cell Phone via "Learning" Function Button," www.ip.com, 2 pages, Feb. 21, 2007.

Kim, Joseph, "2010 mHealth Summit Emerges as Major One-Stop U.S. Venue for Mobile Health," http://www.medicineandtechnology.com/2010/08/2010-mhealth-summit-emerges-as-major.html, 3 pages, Aug. 26, 2010.

Krishnan et al., "A Miniature Surface Mount Reflective Optical Shaft Encoder," Hewlett-Packard Journal, Article 8, pp. 1-6, Dec. 1996.

Rick, "How VESAG Helps Health Conscious Citizens," http://sensetekgroup.com/2010/11/29/wireless-health-monitoring-system/, 2 pages, Nov. 29, 2010.

Sadhu, Rajendra, "How VESAG Helps People Who Want to 'Be There'?," http://ezinearticles.com/?How-Vesag-Helps-People-Who-Want-to-Be-There?&id-5423873, 1 page, Nov. 22, 2010.

Sadhu, Rajendra, "Mobile Innovation Helps Dementia and Alzheimer's Patients," http://www.itnewsafrica.com/2010/11/mobile-innovation-helps-dementia-andalzheimer%E2%80%99s-patients/, 3 pages, Nov. 22, 2010.

Sherr, Sol, "Input Devices," p. 55, Mar. 1988.

Tran et al., "Universal Programmable Remote Control/Telephone," www.ip.com, 2 pages, May 1, 1992.

International Search Report and Written Opinion, PCT/US2019/018522, filed Feb. 19, 2019, dated Jun. 6, 2019, 10 pages.

\* cited by examiner

WATCH CROWN HAVING A CONDUCTIVE SURFACE

CROSS-REFERENCE TO RELATED APPLICATIONS

This application is a non-provisional patent application and claims the benefit of U.S. Provisional Patent Application No. 62/722,796, filed Aug. 24, 2018, and titled "Conductive Cap for Watch Crown," and U.S. Provisional Patent Application No. 62/725,230, filed Aug. 30, 2018, and titled "Watch Crown Assembly," the disclosures of which are hereby incorporated herein by reference in their entirety.

FIELD

The described embodiments relate generally to an electronic watch or other electronic device (e.g., another type of wearable electronic device). More particularly, the described embodiments relate to techniques for assembling a crown for an electronic watch.

BACKGROUND

A crown for a watch may be rotated, translated, and/or touched to provide inputs to the electronic device. The crown may include an electrically conductive portion to receive touch inputs and/or determine a set of biological parameters of a user that wears the watch or other electronic device. Traditional methods and components for assembling an input device cause challenges with part alignment, electrical isolation, and crown performance.

SUMMARY

Embodiments of the systems, devices, methods, and apparatuses described in the present disclosure are directed to a crown, an electronic watch or other electronic device (e.g., another type of wearable electronic device) having a crown, and methods for assembling a crown.

In a first aspect, the present disclosure describes an electronic watch. The electronic watch includes an enclosure defining an opening and a crown extending through the opening and configured to receive a rotational input and a translational input. The crown includes an inner crown body defining a conductive surface and an outer crown body at least partially surrounding the inner crown body. The crown further includes an isolator positioned between the inner crown body and the outer crown body and electrically isolating the inner crown body from the outer crown body. The crown further includes a retainer coupling the inner crown body to the outer crown body and securing the isolator between the inner crown body and the outer crown body. The electronic watch further includes a display positioned at least partially within the enclosure and configured to provide a graphical output that is responsive to each of the rotational input and the translational input.

In another aspect, the present disclosure describes an electronic watch. The electronic watch includes an enclosure defining an opening and a processing unit positioned within the enclosure. The electronic watch further includes a crown operably coupled to the processing unit and positioned along a side of the enclosure. The crown is configured to receive a rotational input and a translational input. The crown includes a shaft extending through the opening, an inner crown body attached to the shaft, an outer crown body surrounding the inner crown body, and a retainer coupling the inner crown body to the outer crown body. The crown further includes an isolator secured between the inner crown body and the outer crown body and electrically isolating the inner crown body from the outer crown body.

In still another aspect of the disclosure, a crown for an electronic watch is described. The crown includes a conductive shaft configured to extend through an opening in an enclosure of the electronic watch. The crown further includes an inner crown body structurally coupled to the shaft and comprising a conductive surface that is operably coupled to the conductive shaft. The crown further includes an outer crown body positioned around the inner crown body and coupled to the inner crown body. The crown further includes an isolator secured between the outer crown body and the inner crown body and a retainer configured to draw the outer crown body and the inner crown body against the isolator. The crown is configured to receive a rotational input and a translational input and a graphical output of a display of the electronic watch is responsive to each of the rotational input and the translational input.

In addition to the example aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
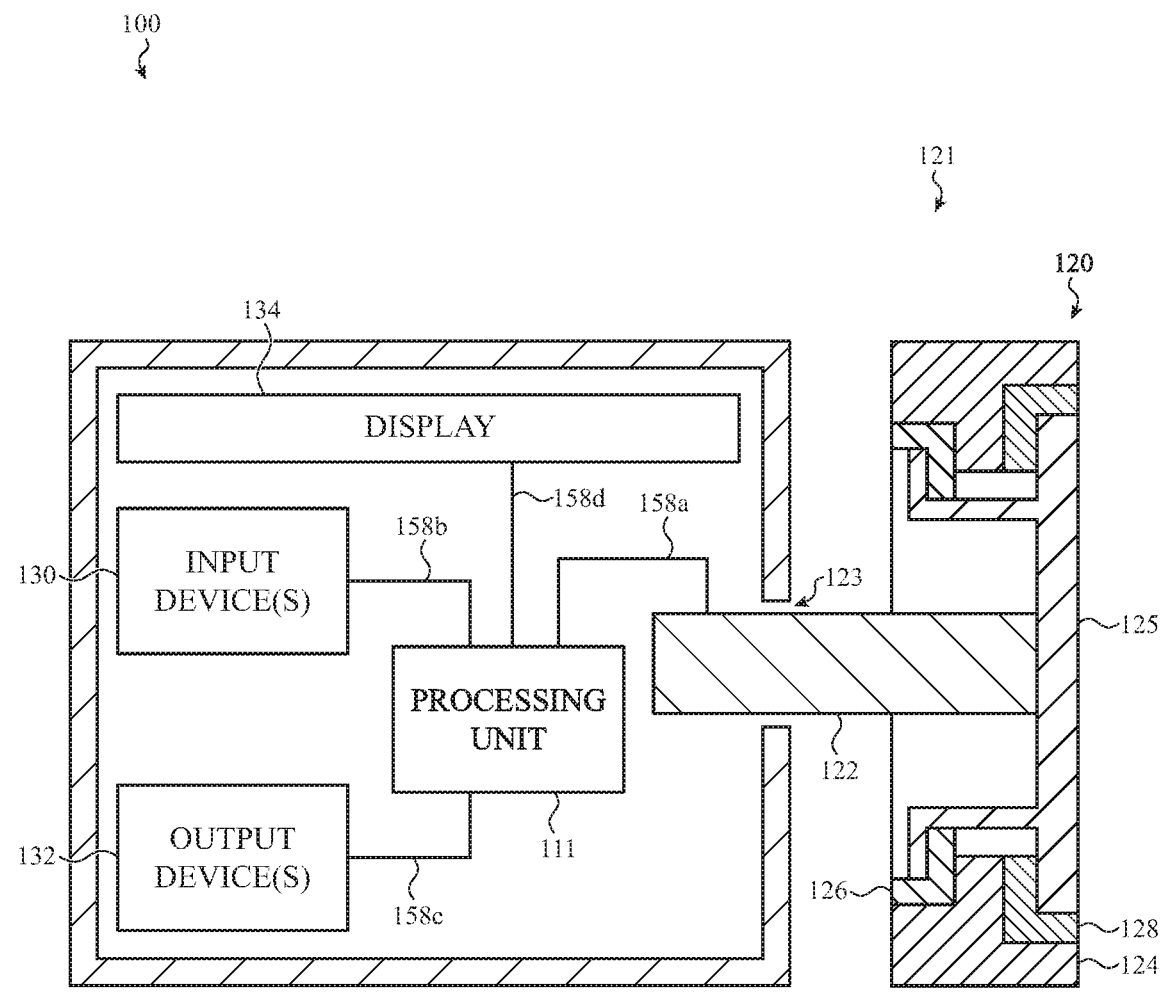
FIG. 1A shows a functional block diagram of an electronic device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The following disclosure relates to an input mechanism, such as a crown for an electronic watch, that may receive translational inputs, rotational inputs, and/or touch inputs. Inputs received at the crown may result in changes in operation of the electronic device and/or outputs, such as graphical outputs, provided by the electronic device. In various embodiments, the crown includes a rotatable and translatable crown body and positioned at least partially outside of the device enclosure and a shaft extending from the crown body and extending through an opening in a device enclosure of an electronic device and.

In some cases, the crown body includes an inner crown body, an outer crown body at least partially surrounding the inner crown body, and an isolator positioned between the outer crown body and the inner crown body. The isolator may electrically isolate the outer crown body from the inner crown body. In some cases, the crown includes a retainer that couples the inner crown body to the outer crown body and/or secures the isolator between the inner crown body and the outer crown body.

The term "attached," as used herein, may be used to refer to two or more devices, elements, structures, objects, components, parts or the like that are structurally affixed, fastened, and/or retained to one another. The term "coupled," as used herein, may be used to refer to two or more devices, elements, structures, objects, components, parts or the like that are structurally attached to one another, operate with one another, communicate with one another, are in electrical connection with one another, and/or otherwise interact with one another. Accordingly, while elements attached to one another are coupled to one another, the reverse is not required. The term "secured," as used herein, may be used to refer to two or more devices, elements, structures, objects, components, parts or the like that are attached or structurally coupled.

As used herein, "operably coupled" or "electrically coupled" may be used to refer to two or more devices, elements, structures, objects, components, parts or the like that are coupled in any suitable manner for operation and/or communication, including wiredly, wirelessly, or some combination thereof. The term "electrically isolated," as used herein, may be used to refer to devices, elements, structures, objects, components, parts or the like that do not exchange electrical signals or exchange very few electrical signals by virtue of being physically separated by an insulator or otherwise separated or insulated from one another.

In some cases, rotational and/or translational inputs provided at the rotatable crown body cause the shaft to translate and/or rotate. In general, the term "rotational input" may be used to refer to an input that causes a rotation of the crown and the term "translational input" may be used to refer to an input that causes a linear translation or displacement of the crown. One or more sensors may detect the rotation and/or translation and, in response, provide signal(s) to one or more circuits of the electronic device, such as a processing unit, for processing of the received input(s).

The crown body may include a conductive portion (e.g., the inner crown body) that defines a conductive surface, such as a touch-sensitive surface, for receiving touch inputs. In general, the term "touch input" may be used to refer to a touch or gesture applied to the crown by a finger, thumb, or other body part of the user. The touch input may be momentary or sustained, depending on the user's interaction with the device. The conductive portion having a conductive surface may be configured to measure an electrical property associated with the touch. For example, the conductive surface may function as an electrode to sense voltages or signals indicative of one or more touch inputs and/or biological parameters, such as an electrocardiogram, of a user in contact with the conductive surface.

The conductive portion or conductive surface may be electrically coupled to one or more circuits of the electronic device to transmit signals from the conductive surface for detection and processing as touch inputs and/or biological parameters. For example, the conductive surface may be electrically coupled to the shaft, and an end of the shaft interior to the enclosure, or a conductive shaft retainer interior to the enclosure, may be in mechanical and electrical contact with a connector (e.g., a spring-biased conductor) that carries electrical signals between the shaft or shaft retainer and a circuit (e.g., a processing unit), thereby providing electrical communication between the crown and the circuit.

In some embodiments, the outer crown body is electrically isolated from the shaft and/or inner crown body to prevent electrical grounding of the inner crown body with other components of the electronic device, such as the device enclosure, and/or to allow users to provide rotational and/or translational inputs at the crown without accidentally providing touch inputs by contacting the conductive surface of the inner crown body. Similarly, the crown may be electrically isolated from the enclosure.

In some cases, the retainer engages the shaft and/or the crown body to secure the parts of the crown to one another. As used herein, the term "engage" may be used to refer to creating a mechanical interlock between components, fitting components together, and/or otherwise attaching or coupling components together. Components may engage one another without direct contact, such as via an intermediate component positioned between the components.

In some embodiments, the retainer includes one or more retention features that create a mechanical interlock with one or more engagement features of the shaft to retain and position the shaft. The retention features and the engagement features may be ramped features that engage one another as the retainer and the shaft are rotated relative to one another. Rotating the retainer and the shaft relative to one another may cause the retainer to engage the outer crown body. In some cases, the crown includes a support plate disposed between the retainer and the outer crown body such that the retainer contacts the support plate, which contacts the outer crown body. In various embodiments, the retainer engaging the shaft attaches and/or couples one or more additional components of the crown, such as the bushing, the isolator, one or more spacers, and/or the like.

In various embodiments, the crown includes multiple components that are assembled together during an assembly process. In various cases, one or more components of the crown may be attached, coupled, secured, and/or integrally formed with one another. As used herein, the term "integrally formed with" may be used to refer to defining or forming a unitary structure. In some cases, the inner crown body may be integrally formed with the shaft (e.g., the shaft and the inner crown body are a single part). The embodiments of the crown described herein provide a simple and robust input mechanism for receiving rotational, translational, and touch inputs as described above, while simplifying part alignment, ensuring consistent rotation, and allowing for efficient manufacturing.

As discussed above, a shaft of the crown may extend through an opening in a device enclosure of the electronic device. In some cases, the crown may contact one or more components of the electronic device, such as a collar, that define and/or extend from the opening through which the shaft of the crown extends. The crown may rotate and or translate relative to the collar during operation. The crown may include a bushing disposed around the shaft. The bushing may define a rotational and/or translational bearing surface between the crown and a surface within the opening in the device enclosure, such as a surface of the collar. The bushing may allow for consistent rotation of the crown across all angular positions of the crown relative to the electronic device, for example by defining a surface that is concentric to a surface of the collar. The bushing may further allow for consistent rotation of the crown over time by reducing wear on the shaft and/or the collar.

These and other embodiments are discussed with reference to FIGS. 1-10. However, those skilled in the art will readily appreciate that the detailed description given herein with respect to these figures is for explanatory purposes only and should not be construed as limiting.

FIG. 1A shows a functional block diagram of an electronic device 100. In some examples, the device 100 may be an electronic watch or electronic health monitoring device. The electronic device 100 may include a device enclosure 116 and a crown 121, one or more input devices 130, one or more output devices 132, a display 134, and a processing unit 111 disposed at least partially within the enclosure 116.

In some cases, the electronic device 100 includes a crown 121 having a conductive portion that may be used to perform an ECG measurement. The crown 121 is configured to receive translational inputs, rotational inputs, and/or touch inputs. Inputs received at the crown 121 may result in changes in outputs provided by the electronic device such as a graphical output of the display, and/or otherwise modify operations of the electronic device. In some cases, the crown 121 may be positioned along a side of the enclosure 116, and may extend through an opening 123 defined in the enclosure. The crown 121 may include a user-rotatable crown body 120 coupled to the shaft and positioned at least partially outside of the device enclosure and a shaft 122 extending from the crown body and extending through the opening 123. In some cases, the crown body 120 includes an inner crown body 125, an outer crown body 124 positioned around and/or at least partially surrounding the inner crown body, and an isolator 128 positioned between the outer crown body and the inner crown body. The isolator 128 may electrically isolate the outer crown body 124 from the inner crown body 124.

In various embodiments, the inner crown body 125 is coupled to the outer crown body 124, and the isolator 128 is secured between the outer crown body and the inner crown body. In some cases, the crown 121 includes a retainer 126 that couples the inner crown body 125 to the outer crown body 124 and/or secures the isolator between the inner crown body and the outer crown body. As shown in FIG. 1A, in some cases, the retainer 126 compresses the isolator between the outer crown body 124 and the inner crown body 125. Said another way, the retainer may engage with the inner crown body 125 to exert a compressive force on the isolator 128 and/or the outer crown body 124 to secure the components together.

As discussed above, in some cases, at least a portion of the inner crown body 125 is conductive, and the inner crown body 125 defines a conductive surface for receiving touch inputs. In some cases, the conductive surface functions as an electrode to sense voltages or signals indicative of one or more touch inputs and/or biological parameters, such as an electrocardiogram, of a user in contact with the conductive surface. The enclosure 116 may define another touch-sensitive or conductive surface that is electrically coupled to the processing unit 111 and also functions as an electrode. The processing unit 111 may determine an electrocardiogram using outputs of the electrodes of the inner crown body 125 and the enclosure 116. In various embodiments, the crown 121 is electrically isolated from the enclosure, for example to allow separate measurements at the electrodes. In various embodiments, the inner crown body 125 may be electrically coupled to the processing unit or another circuit of the electronic device 100, for example via a connector 158*a* and/or the shaft 122.

As discussed above, the display 134 may be disposed at least partially within the enclosure 116. The display 134 provides a graphical output, for example associated with an operating system, user interface, and/or applications of the electronic device 100. In one embodiment, the display 134 includes one or more sensors and is configured as a touch-sensitive (e.g., single-touch, multi-touch) and/or force-sensitive display to receive inputs from a user. The display 134 is operably coupled to the processing unit 111 of the electronic device 100, for example by a connector 158*d*. In various embodiments, a graphical output of the display 134 is responsive to inputs provided at the crown 121, the display, or another input device 130. For example, the processing unit 111 may be configured to modify the graphical output of the display 134 in response to determining an electrocardiogram, receiving rotational inputs, receiving translational inputs, or receiving touch inputs. The display 134 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 134 is positioned beneath and viewable through a cover sheet that forms at least a portion of the enclosure 116.

Broadly, the input devices 130 may detect various types of input, and the output devices 132 may provide various types of output. The processing unit 111 may receive input signals from the input devices 130 in response to inputs detected by the input devices. The processing unit 111 may interpret input signals received from one or more of the input devices 130 and transmit output signals to one or more of the output devices 132. The output signals may cause the output devices 132 to provide one or more outputs. Detected input at one or more of the input devices 130 may be used to control one or more functions of the device 100. In some cases, one or more of the output devices 132 may be configured to provide outputs that are dependent on, or manipulated in response to, the input detected by one or more of the input devices 130. The outputs provided by one or more of the output devices 132 may also be responsive to, or initiated by, a program or application executed by the processing unit 111 and/or an associated companion device.

In various embodiments, the input devices 130 may include any suitable components for detecting inputs. Examples of input devices 130 include audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 130 may be configured to detect one or more particular types of input and provide a signal (e.g., an input signal) corresponding to the detected input. The signal may be provided, for example, to the processing unit 111.

In some cases, the input devices 130 include set of one or more electrodes. An electrode may be a conductive portion of the device 100 that contacts or is configured to be in contact with a user. The electrodes may be disposed on one or more exterior surfaces of the device 100, including a surface of the crown 121, the enclosure 116, and the like. The processing unit 111 may monitor for voltages or signals received on at least one of the electrodes. In some embodiments, one of the electrodes may be permanently or switchably coupled to a device ground. The electrodes may be used to provide an electrocardiogram (ECG) function for the device 100. For example, a 2-lead ECG function may be provided when a user of the device 100 contacts first and second electrodes that receive signals from the user. As another example, a 3-lead ECG function may be provided when a user of the device 100 contacts first and second electrodes that receive signals from the user, and a third electrode that grounds the user to the device 100. In both the 2-lead and 3-lead ECG embodiments, the user may press the first electrode against a first part of their body and press the second electrode against a second part of their body. The third electrode may be pressed against the first or second body part, depending on where it is located on the device 100. In some cases, the enclosure 116 of the device 100 may function as an electrode. In some cases, input devices, such as buttons, crowns, and the like, may function as an electrode.

The output devices 132 may include any suitable components for providing outputs. Examples of output devices 132 include audio output devices (e.g., speakers), visual output devices (e.g., lights or displays), tactile output devices (e.g., haptic output devices), communication devices (e.g., wired or wireless communication devices), and so on, or some combination thereof. Each output device 132 may be configured to receive one or more signals (e.g., an output signal provided by the processing unit 111) and provide an output corresponding to the signal.

The processing unit 111 may be operably coupled to the input devices 130 and the output devices 132, for example by connectors 158*b* and 158*c*. The processing unit 111 may be adapted to exchange signals with the input devices 130 and the output devices 132. For example, the processing unit 111 may receive an input signal from an input device 130 that corresponds to an input detected by the input device 130. The processing unit 111 may interpret the received input signal to determine whether to provide and/or change one or more outputs in response to the input signal. The processing unit 111 may then send an output signal to one or more of the output devices 132, to provide and/or change outputs as appropriate. The processing unit 111 can be implemented as any electronic device capable of processing, receiving, or transmitting data or instructions. For example, the processing unit 111 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

Figure 1B:
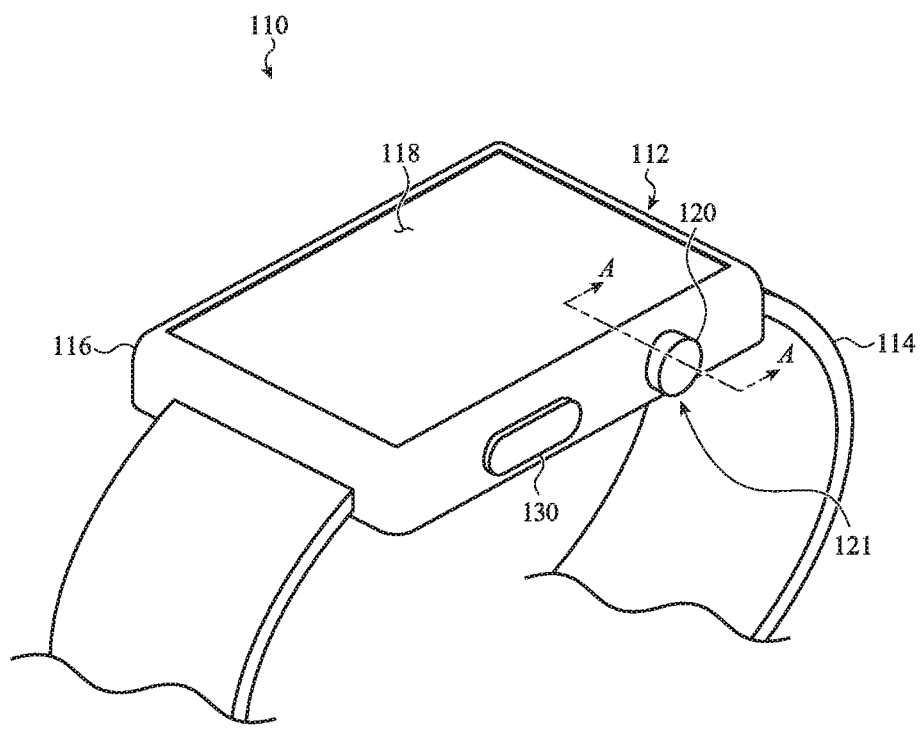
FIG. 1B shows an example of a watch having an electronic crown.

FIG. 1B shows an example of a watch 110 (e.g., an electronic watch or smart watch) that incorporates a crown as described herein. The watch may include a watch body 112 and a watch band 114. Other devices that may incorporate a crown include other wearable electronic devices, other timekeeping devices, other health monitoring or fitness devices, other portable computing devices, mobile phones (including smart phones), tablet computing devices, digital media players, or the like.

The watch body 112 may include an enclosure 116. The enclosure 116 may include a front side enclosure member that faces away from a user's skin when the watch 110 is worn by a user, and a back side enclosure member that faces toward the user's skin. Alternatively, the enclosure 116 may include a singular enclosure member, or more than two enclosure members. The one or more enclosure members may be metallic, plastic, ceramic, glass, or other types of enclosure members (or combinations of such materials).

A cover sheet 118 may be mounted to a front side of the watch body 112 (i.e., facing away from a user's skin) and may protect a display mounted within the enclosure 116. The display may produce graphical output that may be viewable by a user through the cover sheet 118. In some cases, the cover sheet 118 may be part of a display stack, which display stack may include a touch sensing or force sensing capability. The display may be configured to depict a graphical output of the watch 110, and a user may interact with the graphical output (e.g., using a finger, stylus, or other pointer). As one example, the user may select (or otherwise interact with) a graphic, icon, or the like presented on the display by touching or pressing (e.g., providing touch input) on the display at the location of the graphic. As used herein, the term "cover sheet" may be used to refer to any transparent, semi-transparent, or translucent surface made out of glass, a crystalline material (such as sapphire or zirconia), plastic, or the like. Thus, it should be appreciated that the term "cover sheet," as used herein, encompasses amorphous solids as well as crystalline solids. The cover sheet 118 may form a part of the enclosure 116. In some examples, the cover sheet 118 may be a sapphire cover sheet. The cover sheet 118 may also be formed of glass, plastic, or other materials.

In some embodiments, the watch body 112 may include an additional cover sheet (not shown) that forms a part of the enclosure 116. The additional cover sheet may have one or more electrodes thereon. For example, the watch body 112 may include an additional cover sheet mounted to a back side of the watch body 112 (i.e., facing toward a user's skin). The one or more electrodes on the additional cover sheet may be used to determine a biological parameter, such as a heart rate, an electrocardiogram, or the like. In some cases, the electrodes are used in combination with one or more additional electrodes, such as a surface of a crown or other input device.

The watch body 112 may include at least one input device or selection device, such as a crown, scroll wheel, knob, dial, button, or the like, which input device may be operated by a user of the watch 110. In some embodiments, the watch 110 includes a crown 121 that includes a crown body 120 and a shaft (not shown in FIG. 1B). The enclosure 116 may define an opening through which the shaft 122 extends. In some cases, the shaft 122 extends from the crown body 120. The crown body 120 may be attached and/or coupled to the shaft, and may be accessible to a user exterior to the enclosure 116. The crown body 120 may be user-rotatable, and may be manipulated (e.g., rotated, pressed) by a user to rotate or translate the shaft. The shaft may be mechanically, electrically, magnetically, and/or optically coupled to components within the enclosure 116 as one example. A user's manipulation of the crown body 120 and shaft may be used, in turn, to manipulate or select various elements displayed on the display, to adjust a volume of a speaker, to turn the watch 110 on or off, and so on. The enclosure 116 may also include an opening through which a button 130 protrudes. In some embodiments, the crown body 120, scroll wheel, knob, dial, button 130, or the like may be touch sensitive, conductive, and/or have a conductive surface, and a signal route may be provided between the conductive portion of the crown body 120, scroll wheel, knob, dial, button 130, or the like and a circuit within the watch body 112.

The enclosure 116 may include structures for attaching the watch band 114 to the watch body 112. In some cases, the structures may include elongate recesses or openings through which ends of the watch band 114 may be inserted and attached to the watch body 112. In other cases (not shown), the structures may include indents (e.g., dimples or depressions) in the enclosure 116, which indents may receive ends of spring pins that are attached to or threaded through ends of a watch band to attach the watch band to the watch body. The watch band 114 may be used to secure the watch 110 to a user, another device, a retaining mechanism, and so on.

In some examples, the watch 110 may lack any or all of the cover sheet 118, the display, the crown 121, or the button 130. For example, the watch 110 may include an audio input or output interface, a touch input interface, a force input or haptic output interface, or other input or output interface that does not require the display, crown 121, or button 130. The watch 110 may also include the aforementioned input or output interfaces in addition to the display, crown 121, or button 130. When the watch 110 lacks the display, the front side of the watch 110 may be covered by the cover sheet 118, or by a metallic or other type of enclosure member.

Figure 2A:
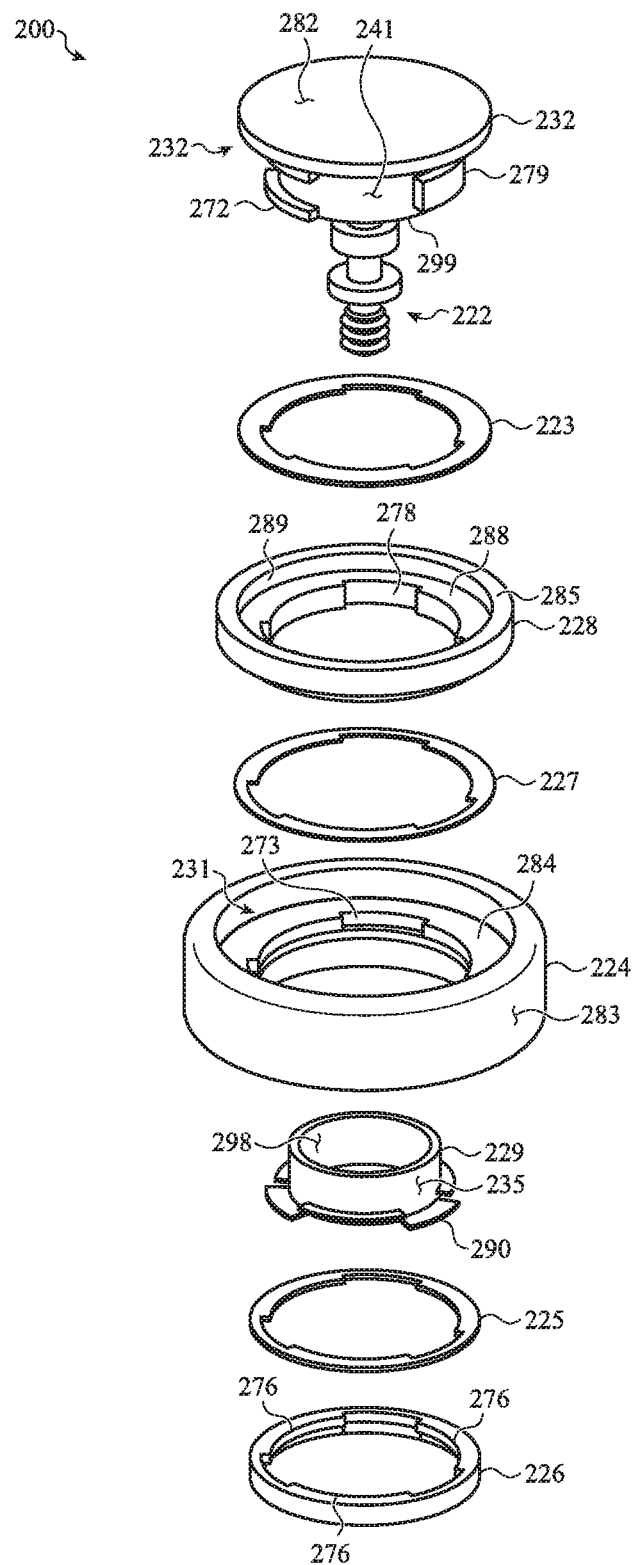
FIG. 2A shows an exploded view of an example crown.

Turning now to FIG. 2A, there is shown an exploded view of an example crown 200 having a conductive inner crown body 232 that may be used to perform an electrocardiogram measurement or receive other touch inputs Similar to the other embodiments described herein, the inner crown body 232 is electrically isolated from the outer crown body 224 by an isolator 228 positioned between the outer crown body and the inner crown body. As shown in FIG. 2A, a retainer 226 is used to couple the inner crown body 232 to the outer crown body 224 and to secure the isolator 228 between the outer crown body and the inner crown body.

The crown 200 includes an inner crown body 232, a shaft 222, spacers 223 and 227, an isolator 228, an outer crown body 224, a bushing 229, a support plate 225, and a retainer 226. The components shown in FIG. 2A may be assembled together in an assembly process to form the crown 200. As shown in FIG. 2A, the spacers 223 and 227, the isolator 228, the outer crown body 224, the bushing 229, the support plate 225, and the retainer 226 engage with one another and cooperate to define an opening through which the shaft 222 extends in the assembled configuration. The shaft 222 and the inner crown body 232 may be a single component or may be formed from multiple components that are attached, coupled, or integrally formed with one another. The retainer 226 engages with the inner crown body 232 to retain the components of the crown 200 together.

In some cases, the inner crown body 232 defines a portion 282 of the external surface of the crown 200. For example, the inner crown body 232 may define a conductive surface for receiving touch inputs, as discussed in more detail below with respect to FIG. 2C. In some cases, the shaft 222 may extend into an interior of the enclosure of an electronic device. The shaft 222 may electrically couple the inner crown body 232 to one or more components in the enclosure of the electronic device. For example, the shaft 222 may electrically couple the conductive surface to a processing unit and/or other circuit(s) of the electronic device such that inputs provided at the conductive surface may be transmitted to the processing unit or other circuits via the shaft. In various embodiments, the shaft 222 and the inner crown body 232 may be formed of any suitable conductive material or combination of materials, including aluminum, titanium, steel, brass, ceramic, doped materials (e.g., plastics), or the like. One or more surfaces of the inner crown body 232 and/or the shaft 222 may be coated or otherwise treated to prevent or mitigate corrosion, wear, grounding effects, and the like. Coating processes may include electrophoretic deposition, physical vapor deposition, and the like. The shaft 222 and/or the inner crown body 232 may include various features for coupling the shaft to the enclosure, a collar, and/or other component(s) of the electronic device. In some cases, the shaft 222 and/or the inner crown body 232 include one or more engagement features (e.g., engagement features 272) for engaging with other components of the crown 200 and/or other components of the electronic device, as discussed in more detail below.

The outer crown body 224, the isolator 228, and the inner crown body 232 may cooperate to define an external surface of the crown in the assembled configuration. The outer crown body 224 may define a portion 283 of the external surface of the crown 200 and the isolator 228 may comprise a cosmetic ring that defines a portion 285 of the external surface of the crown 200. As discussed above, the outer crown body 224 defines an opening through which the shaft 222 may extend. In the assembled configuration, the shaft 222 extends through the opening of the outer crown body 224, the inner crown body 232 is positioned at least partially in the opening of the outer crown body, and the outer crown body may at least partially surround the shaft and the inner crown body. In some cases, the outer crown body 224 defines a recess 231 and/or ledge 284 extending from an internal sidewall defining the opening, and the inner crown body 232 may be positioned in the recess 231 and/or supported by the ledge 284. In some cases, the ledge 284 forms a surface of the recess 231. In various embodiments, the isolator 228 is positioned between the outer crown body 224 and the inner crown body 232 such that the outer crown body at least partially surrounds the isolator and the inner crown body and the isolator at least partially surrounds the inner crown body. The isolator 228 may be positioned within the recess 213 and/or supported by the ledge 284. The isolator 228 defines an opening that may at least partially align with the opening of the outer crown body 224 to create a combined opening through which the shaft 222 and/or the inner crown body 232 may extend. The isolator 228 may be placed on or otherwise supported by the ledge 284 of the outer crown body 224. In some cases, the isolator 228 defines a ledge 288. In some cases, the ledge 288 supports and/or retains the inner crown body 232. The isolator 228 may define a sidewall 289 extending above the ledge that is positioned between the inner crown body 232 and the outer crown body 224.

The outer crown body 224 defines the outer perimeter of the crown 200 and is configured to be contacted by the user as the user provides a rotational input. The outer crown body may include tactile features or textures and may be made from materials including conductive and non-conductive materials (e.g., aluminum, stainless steel, ceramics, or the like). The isolator 228 may be formed of any suitable electrically isolating or other non-conductive material, such as plastic, ceramic, or the like. In some cases, the isolator 228 is formed prior to assembly. In some embodiments, the isolator 228 may be insert molded between the shaft 222 and the outer crown body 224 and/or integrally formed with the outer crown body 224, for example as discussed below with respect to FIGS. 4A-4E. In some cases, the outer crown body 224 is formed of a conductive material and the isolator 228 is formed of a non-conductive material to electrically isolate the outer crown body 224 from the inner crown body 232, for example to perform an ECG measurement using the inner crown body 232 and the enclosure of the electronic watch. In some cases, the outer crown body 224 may be formed of a non-conductive material, such as ceramic. In some cases, if the outer crown body 224 is non-conductive, the isolator 228 may be formed of a conductive material, such as metal or ceramic.

In some cases, one or more spacers 223 may be placed between the inner crown body 232 and the isolator 228. Similarly, one or more spacers 227 may be placed between the isolator 228 and the outer crown body 224. In some cases, the spacers 223 and 227 are formed from a heat-activated film that allows gaps between the inner crown body 232 and the isolator 228 and between the isolator 228 and the outer crown body 224 to be established during assembly and then subsequently maintained to maintain part alignment. In some embodiments, the spacers 223 and 227 may be insert molded into the crown 200 and/or integrally formed with the outer crown body 224, the shaft 222, and/or the outer crown body 224.

In some cases, the inner crown body 232, the isolator 228, and/or the outer crown body 224 include features for creating one or more mechanical interlocks between one another. For example, the outer crown body 224 may include indentations 273 that engage with protrusions 277 on the isolator 228. Similarly, the isolator 228 may include indentations 278 that engage with protrusions 279 on the inner crown body 232. The protrusions and indentations may engage with one another to create a mechanical interlock that prevents the isolator 228, the outer crown body 224, and the inner crown body 232 (and thus the shaft 222), from rotating relative to one another when a torque is applied to the crown. This allows a torque applied to the outer crown body 224 to be transferred to the shaft 222, for example to provide rotational inputs.

The inner crown body 232 may define a wall 299 that extends around a portion of the shaft 222. In some cases, the engagement features 272 may be positioned along an outer surface 241 of the wall 299. In the assembled configuration, the bushing 229 may be positioned along an inner surface of the wall 299 and at least partially around the shaft 222. The bushing 229 may define a rotational and/or translational bearing surface between the inner crown body 232 and one or more surfaces of the electronic device. The bushing 229 may be formed from any suitable material or combination of materials, such as plastic. In some embodiments, the bushing 229 may be molded on and/or integrally formed with one or more additional components of the crown 200 or electronic device, such as the inner crown body 232. The bushing 229 is discussed in more detail below with respect to FIGS. 2B and 2C.

The retainer 226 couples the inner crown body 232 to the outer crown body 224, and secures the isolator 228 between the inner crown body and the outer crown body. The retainer 226 may be positioned at least partially around the shaft 222 and/or the inner crown body 232 in the assembled configuration and may engage with the inner crown body and/or one or more additional components of the crown 200 to secure the components of the crown together. In various embodiments, the inner crown body 232 and the retainer 226 apply compressive forces to the other components of the crown 200 to secure the components together. In some cases, the retainer 226 compresses the isolator 228 between the inner crown body 232 and the outer crown body 224. For example, the retainer 226 may engage the inner crown body 232 to cooperate with the inner crown body to apply a compressive force to couple the inner crown body 232 to the outer crown body 224, and secures the isolator 228 between the inner crown body and the outer crown body. At least a portion of the isolator 228, the spacers 223 and 227, the outer crown body 224, the bushing, and/or the support plate 225 may be positioned between at least a portion of the inner crown body 232 and the retainer 226, and the inner crown body 232 and the retainer 226 apply compressive forces to the components positioned between them to secure the components together.

In some cases, the retainer 226 may draw components of the crown 200 together, for example during a manufacturing process, to secure the components to one another. In some cases, the retainer 226 draws the outer crown body 224 and the inner crown body 232 against the isolator 228. In some cases, the retainer 226 includes one or more retention features 276 that engage with other components of the crown 200 to couple the components of the crown 200 together. For example, the retention features 276 may engage with the engagement features 272 of the inner crown body 232. In some cases, the retention features 276 and/or the engagement features 272 are shaped such that rotating the retainer 226 relative to the inner crown body 232 (and/or rotating the inner crown body relative to the retainer) engages and/or tightens an engagement between the retainer and the inner crown body. In some cases, rotating the retainer 226 relative to the inner crown body 232 draws the outer crown body 224 and the inner crown body against the isolator 228 to compress the isolator between the inner crown body and the outer crown body. For example, as shown in FIG. 2A, the retention features 276 may be ramped, such that a first end of each retention feature has a thickness greater than a thickness of a second end. Similarly, the engagement features 272 may be ramped, such that a first end of each engagement feature has a thickness greater than a thickness of a second end. The engagement features 272 and the retention features 276 behave similarly to threads to convert rotational movement or force to linear movement or force. For example, rotating the retainer 226 relative to the inner crown body 232 (and/or rotating the inner crown body relative to the retainer) in a first direction may decrease a distance between the retainer and the inner crown body and/or increase a compressive force exerted on other components of the crown 200 by the retainer and/or the inner crown body. Similarly, rotating the retainer 226 relative to the inner crown body 232 (and/or rotating the inner crown body relative to the retainer) in a second direction opposite the first direction may increase a distance between the retainer and the inner crown body and/or reduce a compressive force exerted on other components of the crown 200 by the retainer and/or the inner crown body. The retainer 226 may be formed from any suitable material or combination of materials, such as plastic, metal, or the like. In some embodiments, the retainer 226 may be molded on and/or integrally formed with one or more additional components of the crown 200 or electronic device.

The bushing 229 may include one or more features for coupling the bushing to the other components of the crown 200. For example, the bushing 229 may include features 290 that engage with the retention features 276 of the retainer 226 to couple the bushing 229 to other components of the crown 200.

The support plate 225 may be positioned between the retainer 226 and the outer crown body 224. The support plate 225 may engage the outer crown body 224 and may define an engagement surface that the retainer 226 may contact to form an engagement between the retainer and the outer crown body. The support plate 225 may be formed from any suitable material or combination of materials, such as plastic, metal, or the like. In some embodiments, the support plate 225 may be molded on and/or integrally formed with one or more additional components of the crown 200 or electronic device, such as the retainer 226. In some cases, the retainer 226 is formed from a different material than the retainer 226. The retainer 226 may be formed from a material that will not damage other components of the crown upon engagement, such as damaging a coating of the inner crown body 232. The support plate 225 may be made of a hard and/or rigid material, such as metal, to provide a robust engagement surface for the retainer 226.

Figure 2B:
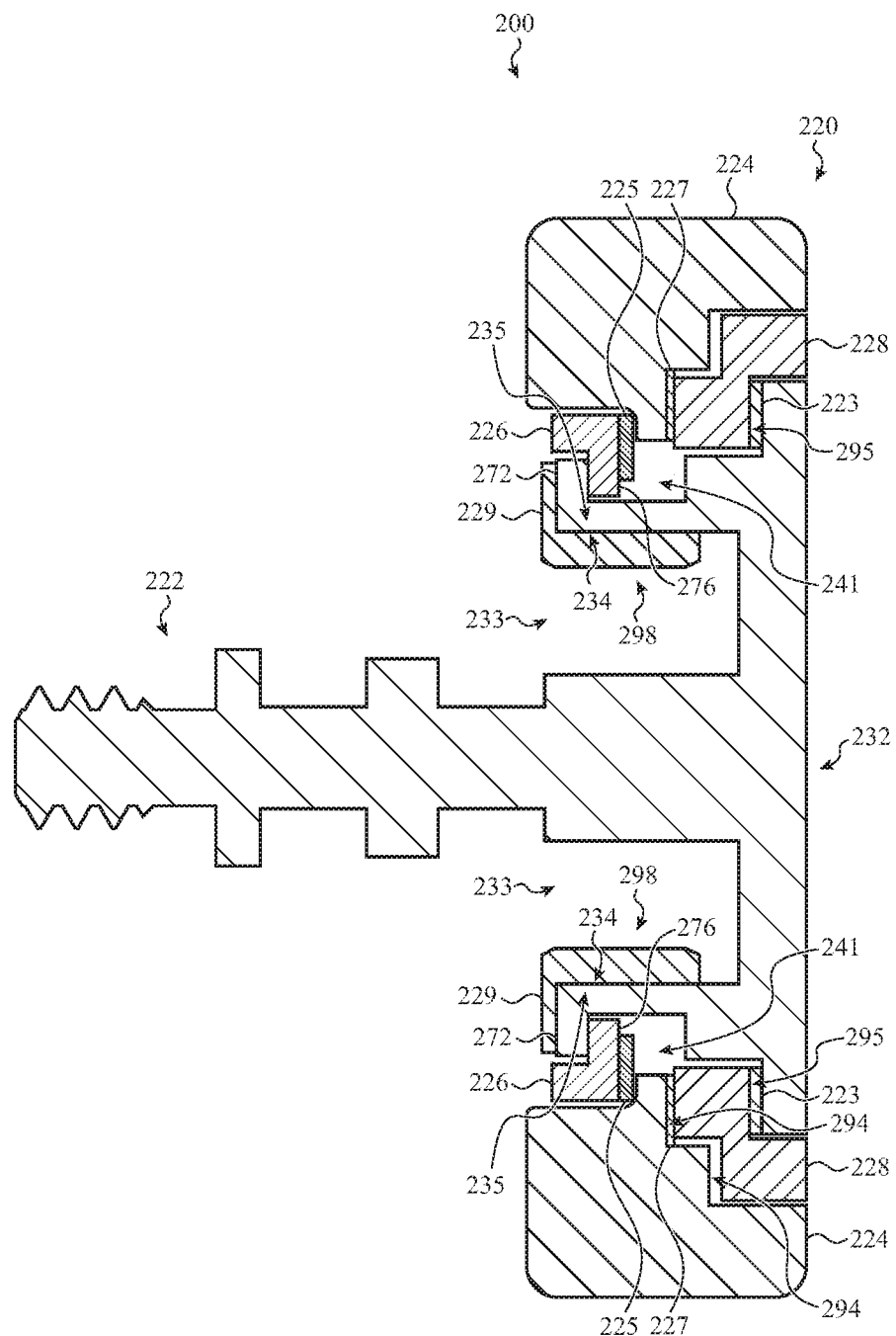
FIG. 2B shows a cross-section of a crown in an assembled configuration.

FIG. 2B shows a cross-section of a crown 200 in an assembled configuration. As shown in FIG. 2B, the crown 200 includes a crown body 220 and a shaft 222 extending from the crown body. As discussed above, the shaft 222 may extend from the inner crown body 232. In various embodiments, the shaft 222 is electrically coupled to the inner crown body 232. As discussed above, the shaft 222 may be attached to and/or integrally formed with one or more components of the crown body 220. For example, the inner crown body 232 and the shaft 222 may be attached or integrally formed (e.g., a single part). Generally, the shaft 222 is rotatable and configured to extend through an opening in an enclosure, such as the enclosure described with reference to FIG. 1B.

In some cases, the inner crown body 232, the isolator 228, and the outer crown body 224 cooperate to form an external surface of the crown body 220. As described above with respect to FIG. 2A, the isolator 228 may at least partially surround the inner crown body 232, and the outer crown body 224 may at least partially surround the isolator 228 and/or the inner crown body 232. The inner crown body 232 may define a conductive surface of the crown 200, for example to receive signals for measuring an electrocardiogram or another touch input. The isolator 228 and/or spacers 223 and 227 may electrically isolate the inner crown body 232 and the shaft 222 from the outer crown body 224, as discussed in more detail below with respect to FIG. 2C. In some cases, the inner crown body 232, the isolator 228, and the outer crown body 224 cooperate to form a smooth and continuous external surface of the crown body 220. For example, as shown in FIG. 2B, the portions of the external surface defined by the inner crown body 232, the isolator 228, and the outer crown body 224 are aligned with one another to form a continuous external surface.

As shown in FIG. 2B, the outer crown body 224 may define an opening and one or more isolator engagement surfaces 294, for example along ledges extending into the opening. The isolator 228 may engage the outer crown body 224 along isolator engagement surface(s) 294 defined on the ledge. In some cases, the isolator 228 engages the outer crown body 224 indirectly, such as through the spacer 227. The isolator 228 may define one or more inner crown body engagement surfaces 295, for example along one or more ledges configured to support the inner crown body 232. The inner crown body 232 may engage the isolator 228 along the inner crown body engagement surface 295. In some cases, the inner crown body 232 engages the isolator 228 indirectly, such as through the spacer 223. As discussed above, the spacers 223 and 227 may define gaps between the outer crown body 224, the isolator 228, and the inner crown body 232. The dimensions of the gaps may be set, for example during assembly, to ensure alignment of the inner crown body 232, the isolator 228, and the outer crown body 224 along the external surface.

The retainer 226 may engage the inner crown body 232 and the outer crown body 224 to secure the components of the crown 200 together. For example, a retention feature 276 of the retainer 226 may engage an engagement feature 272 of the inner crown body 232 as discussed above. The outer crown body 224 may define a retainer engagement surface 297 on a side of a ledge opposite an isolator engagement surface 294. The retainer 226 may engage the outer crown body 224 along the retainer engagement surface 297. The retainer 226 may engage the outer crown body 224 indirectly, such as through the support plate 225. As shown in FIG. 2B, the engagement of the inner crown body 232 with the retainer 226 and the isolator 228 creates a compressive force that secures the components of the crown 200 together.

Figure 2C:
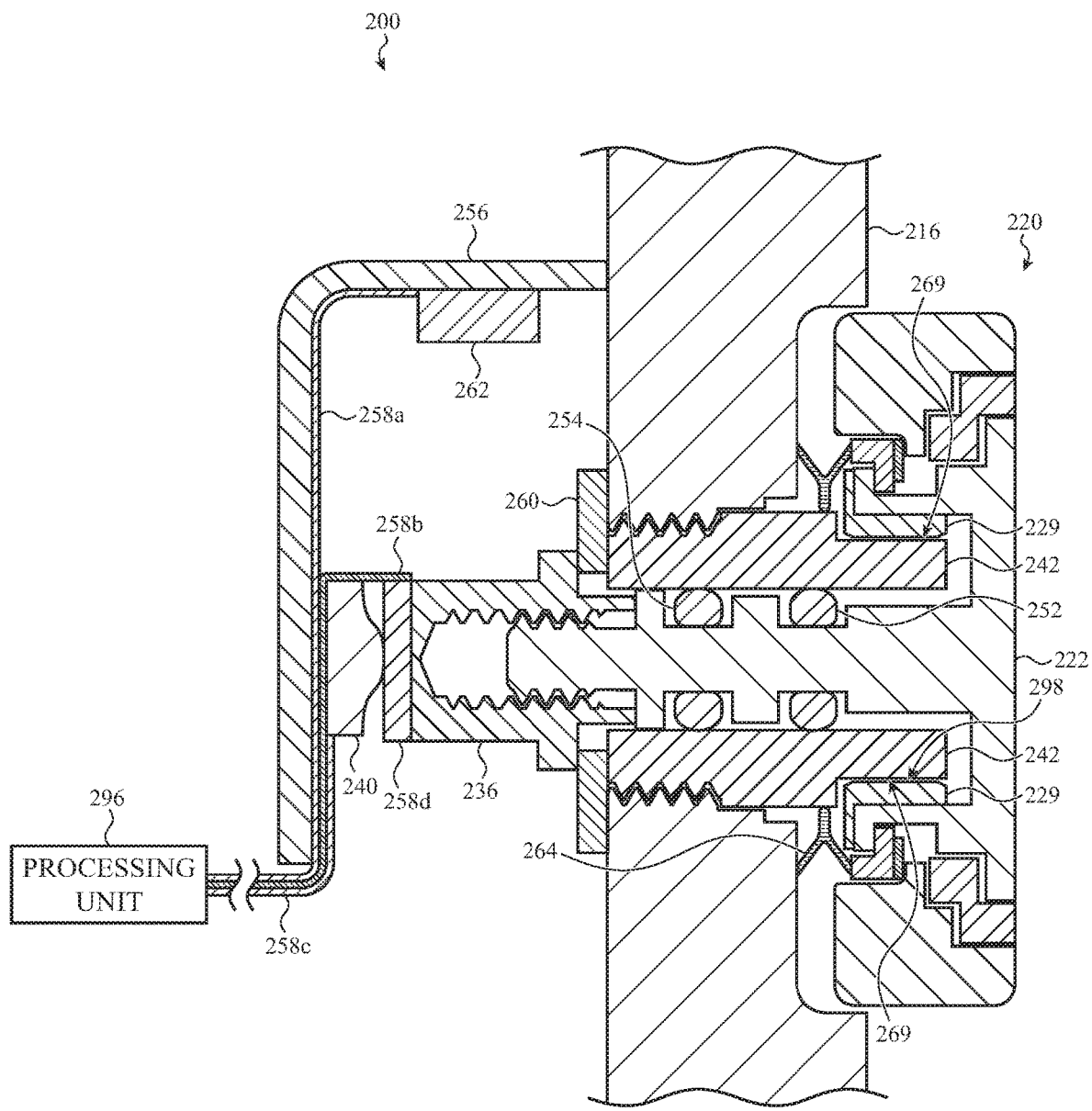
FIG. 2C shows a cross-section view of an example of a crown installed in an electronic device, taken through section line A-A of FIG. 1B.

Turning now to FIG. 2C, there is shown an example of a crown 200 installed in an electronic watch, taken through section line A-A of FIG. 1B, as viewed from the front or rear face of a watch body. As shown in FIG. 2C, a collar 242 extends from an opening in the enclosure 216 and defines an opening through which the shaft 222 extends. The crown 200 may rotate and or translate relative to the collar 242 during operation. As described above, the bushing 229 may define a rotational and/or translational bearing surface between the inner crown body 232 and the collar 242. In some cases, an outer surface 235 of the bushing 229 may be at least partially positioned along an inner surface 234 of the wall 299, and an inner surface 298 of the bushing may form a bearing surface configured to contact the collar 242. The bearing surface 298 and the surface 269 may define a sliding or rotating bearing interface between the crown 200 and the collar 242. In some cases, the bearing surface 298 of the bushing 229 contacts a surface 269 of the collar 242 to stabilize the crown 200 and/or to facilitate consistent rotation of the crown 200. The bearing surface 298 may be concentric to the surface 269 of the collar 242 to allow for consistent rotation of the crown 200 across all angular positions of the crown relative to the electronic device. The bushing 229 may further allow for consistent rotation of the crown 200 over time by reducing wear on the crown 200 and/or the collar 242.

The crown body 220 may be rotated by a user of an electronic watch, to in turn rotate the shaft 222. In some cases, the outer crown body 224 is configured to receive rotational inputs. In some cases, the crown body 220 may also be pulled or pushed by the user to translate the shaft 222 along its axis (e.g., left and right with respect to FIG. 2C). The crown body 220 may be electrically coupled to a circuit within the enclosure 216 (e.g., a processing unit 296), but electrically isolated from the enclosure 216.

A shaft retainer 236 may be structurally coupled to the shaft 222, interior to the enclosure 216 (e.g., interior to a watch body enclosure), after the shaft is inserted through the opening in the enclosure 216 with the crown body 220 positioned exterior to the enclosure 216. In some cases, the shaft retainer 236 may include a nut, and the shaft 222 may have a threaded male portion that engages a threaded female portion of the nut. In some cases, the shaft retainer 236 may be conductive, or have a conductive coating thereon, and mechanical connection of the shaft retainer 236 to the shaft 222 may form an electrical connection between the shaft retainer 236 and the shaft 222. In an alternative embodiment (not shown), the shaft retainer 236 may be integrally formed with the shaft 222, and the shaft 222 may be inserted through the opening in the enclosure 216 from inside the enclosure and then attached to the crown body 220 (e.g., the crown body 220 may screw onto the shaft 222).

A washer or C-clip 260 may be positioned between the shaft retainer 236 and the enclosure 216 or another component of the electronic device. For example, a non-conductive (e.g., plastic) washer, plate, or shim may be structurally coupled to the interior of the enclosure 216, between the shaft retainer 236 and the enclosure 216. The C-clip 260 may provide a bearing surface for the shaft retainer 236.

In some embodiments, a collar 242 may be aligned with the opening in the enclosure 216. In some embodiments, the collar 242 be coupled to the enclosure 216 or another component internal to the enclosure (not shown) via threads on a male portion of the collar 242 and corresponding threads on a female portion of the enclosure 216. Optionally, a gasket made of a synthetic rubber and fluoropolymer elastomer (e.g., Viton), silicone, or another compressible material may be disposed between the collar 242 and the enclosure 216 to provide stability to the collar 242 and/or provide a moisture barrier between the collar 242 and the enclosure 216. Another gasket 264 (e.g., a Y-ring) made of Viton, silicone, or another compressible material may be placed over the collar 242, before or after insertion of the collar 242 through the opening, but before the shaft 222 is inserted through the collar 242. The second gasket 264 may provide a moisture barrier between the crown body 220 and the enclosure 216 and/or the crown body 220 and the collar 242.

As shown in FIG. 2C, one or more O-rings 252, 254 or other gaskets may be positioned within grooves of the shaft 222 before the shaft 222 is inserted into the collar 242. The O-rings 252, 254 may be formed of a synthetic rubber and fluoropolymer elastomer, silicone, or another compressible material. In some cases, the O-rings 252, 254 may provide a seal between the shaft 222 and the collar 242. The O-rings 252, 254 may also function as an insulator between the shaft 222 and the collar 242. In some embodiments, the O-rings 252, 254 may be fitted to recesses in the shaft 222.

In some embodiments, a rotation sensor 262 for detecting rotation of the crown 200 is disposed within the enclosure 216. The rotation sensor 262 may include one or more light emitters and/or light detectors. The light emitter(s) may illuminate an encoder pattern or other rotating portion of the shaft 222 or shaft retainer 236. The encoder pattern may be carried on (e.g., formed on, printed on, etc.) the shaft 222 or the shaft retainer 236. The light detector(s) may receive light emitted by the light emitter(s) and reflected from the shaft. The light detector(s) may be operably coupled to the processing unit 296, which may determine a direction of rotation, speed of rotation, angular position, translation, or other state(s) of the crown 200. In some embodiments, the rotation sensor 262 may detect rotation of the crown 200 by detecting rotation of the shaft 222. The rotation sensor 262 may be electrically coupled to the processing unit 296 of the electronic device by a connector 258a.

In some embodiments, a translation sensor 244 for detecting translation of the crown 200 is disposed within the enclosure 216. In some embodiments, the translation sensor 244 includes an electrical switch, such as a tactile dome switch, which may be actuated or change state in response to translation of the crown 200. Thus, when a user presses on the crown body 220, the shaft 222 may translate or displace into the enclosure 216 (e.g., into the enclosure of a watch body) and actuate the switch, placing the switch in one of a number of states. When the user releases pressure on the crown body 220 or pulls the crown body 220 outward from the enclosure 216, the switch may retain the state in which it was placed when pressed, or advance to another state, or toggle between two states, depending on the type or configuration of the switch.

In some embodiments, the translation sensor 244 includes one or more light emitters and/or light detectors. The light emitter(s) may illuminate an encoder pattern or other portion of the shaft 222 or shaft retainer 236. The light detector(s) may receive reflections of the light emitted by the light emitter(s), and a processing unit 296 may determine a direction of rotation, speed of rotation, angular position, translation, or other state(s) of the crown 200. In some embodiments, the translation sensor 244 may detect translation of the crown 200 by detecting translation of the shaft 222. The translation sensor 244 may be electrically coupled to a processing unit 296 of the electronic device by a connector 258c.

In various embodiments, the shaft 222 and the crown body 220 are in electrical communication with a processing unit 296 and/or one or more other circuits of an electronic device. One or more connectors may electrically couple the shaft 222 to the processing unit 296 and/or one or more other circuits. In some cases, the shaft retainer 236 is conductive and cooperates with one or more connectors to couple the shaft 222 to the processing unit 296 and/or one or more other circuits. In various cases, a connector 258d is in mechanical and electrical contact with the shaft retainer 236 (or in some cases with the shaft 222, such as when the shaft extends through the shaft retainer (not shown)). In some cases, the connector 258d may be formed (e.g., stamped or bent) from a piece of metal (e.g., stainless steel). In other cases, the connector 258d may take on any of several forms and materials. When the shaft 222 is translatable, translation of the shaft 222 into the enclosure (e.g., into the enclosure of a watch body) may cause the connector 258d to deform or move. However, the connector 258d may have a spring bias or other mechanism which causes the connector 258d to maintain electrical contact with the shaft retainer or shaft end, regardless of whether the shaft 222 is in a first position or a second position with reference to translation of the shaft.

In some embodiments of the crown assembly 200, the connector 258d may include a conductive brush that is biased to contact a side of the shaft 222 or a side of the shaft retainer 236. The conductive brush may maintain electrical contact with the shaft 222 or shaft retainer 236 through rotation or translation of the shaft 222, and may be electrically connected to the processing unit 296 and/or another circuit such that the shaft remains electrically coupled to the processing unit as the shaft rotates. This allows the crown 200, and in particular the crown body 220, to remain electrically coupled to the processing unit 296 as the crown 200 is manipulated (e.g., rotated and/or translated) by a user, which allows the electrode(s) on the crown to maintain their functionality as the crown is manipulated.

The processing unit 296 or other circuit of the electronic device may be in electrical communication with the crown 200 via the connector 258d, the shaft retainer 236, and the shaft 222 (or when an end of the shaft 222 protrudes through the shaft retainer 236, the processing unit 296 or other circuit may be in electrical communication with the crown 200 via the connector 258d and the shaft 222). In some cases, the connector 258d is coupled to the processing unit 296 via an additional connector 258b (e.g., a cable, flex, or other conductive member). In some cases, as shown in FIG. 2, the connector 258d may be positioned between the shaft retainer 236 and the translation sensor 240. The connector 258d may be attached to the shaft retainer 236 and/or the translation sensor 240. In some cases, the connector 258d may be connected to the processing unit 296 via the translation sensor 240 and/or the connector 258c. In some cases, the connector 258d is integrated with the translation sensor 240. For example, the shaft retainer 236 may be electrically coupled to the translation sensor 240 to couple the crown 200 to the processing unit 296.

In some embodiments, a bracket 256 may be attached (e.g., laser welded) to the enclosure 216 or another element within the enclosure. The rotation sensor 262 and/or the translation sensor 244 may be structurally coupled to bracket 256, and the bracket may support the rotation sensor 262 and/or the translation sensor 244 within the enclosure 216. In the embodiment shown in FIG. 2C, the rotation sensor 262 and the translation sensor 244 are shown as separate components, but in various embodiments, the rotation sensor 262 and the translation sensor 244 may be combined and/or located in different positions from those shown.

In some embodiments of the crown 200 shown in FIG. 2C, the connector 258b may include a conductive brush that is biased to contact a side of the shaft 222 or a side of the shaft retainer 236. The conductive brush may maintain electrical contact with the shaft 222 or shaft retainer 236 through rotation or translation of the shaft 222, and may be electrically connected to the processing unit 296 and/or another circuit such that the shaft remains electrically coupled to the processing unit as the shaft rotates. This allows the crown body 220 to remain electrically coupled to the processing unit 296 as the crown body 220 is manipulated (e.g., rotated and/or translated) by a user, which allows the conductive surface and/or electrodes on the crown body 220 to maintain its functionality as the crown body 220 is manipulated.

The connectors 258a-c may be electrically coupled to the processing unit 296, for example as discussed with respect to FIG. 10 below. The processing unit 296 may determine whether a user is touching the conductive surface of the crown body 220, and/or determine a biological parameter of the user based on a signal received from or provided to the user via the conductive surface of the crown body 220. In some cases, the processing unit 296 may determine other parameters based on signals received from or provided to the conductive surface of the crown body 220. In some cases, the processing unit 296 may operate the crown 200 and/or one or more additional electrodes as an electrocardiogram measurement device and provide an electrocardiogram to a user of a watch including the crown 200.

As discussed above, in some cases, the inner crown body 232 includes a conductive portion defining a portion of the external surface of the crown body 220. In some cases, the inner crown body 232 defines the conductive surface, and is electrically coupled to the shaft 222. The inner crown body 232 may be a separate part that is structurally coupled to the shaft 222 or the inner crown body 232 and the shaft 222 may be a single part. The inner crown body 232 may function as an electrode, as discussed above. The inner crown body 232 may be formed of any suitable conductive material or combination of materials, including titanium, steel, brass, ceramic, doped materials (e.g., plastics). In various embodiments, it is advantageous for the inner crown body 232 to resist corrosion, so material(s) may be selected that are resistant to corrosion, such as titanium. In some embodiments, one or more attachment mechanism(s) may structurally couple the inner crown body 232 to other components of the crown 200. In some cases, an attachment mechanism that structurally and/or electrically couples the inner crown body 232 to the shaft 222 also structurally couples the inner crown body 232 to other components of the crown 200.

In some embodiments, one or more components of the crown 200 may have a conductive surface covered by a thin non-conductive coating. The non-conductive coating may provide a dielectric for capacitive coupling between a conductive surface and a finger of a user of the crown 200 (or an electronic watch or other device that includes the crown 200). In the same or different embodiments, the crown 200 may have a non-conductive coating on a surface of the crown body 220 facing the enclosure 216. In some examples, the conductive material(s) may include a PVD deposited layer of aluminum titanium nitride (AlTiN) or chromium silicon carbonitride (CrSiCN).

In various embodiments, the crown 200 may include adhesive and/or other fasteners for coupling the components and/or coupling the crown 200 to an electronic device. Any gaps or empty spaces shown in FIG. 2B may be filled with adhesive or other substances to couple the components of the crown, electrically isolate the shaft from other components of the crown 200 and/or protect components of the crown (e.g., provide lubrication, mitigate corrosion, and the like). The example arrangements of components discussed with respect to FIG. 2A-2C are for illustrative purposes, and are not meant to be limiting or exhaustive. In some cases, the crown 200 may include more or fewer components, and the illustrated components may be combined with one another and/or additional components. Similarly, the illustrated components may be divided into multiple separate components. For example, FIGS. 3A-4E illustrate an example embodiment of crowns 300 and 400 having different and/or additional components.

Figure 3A:
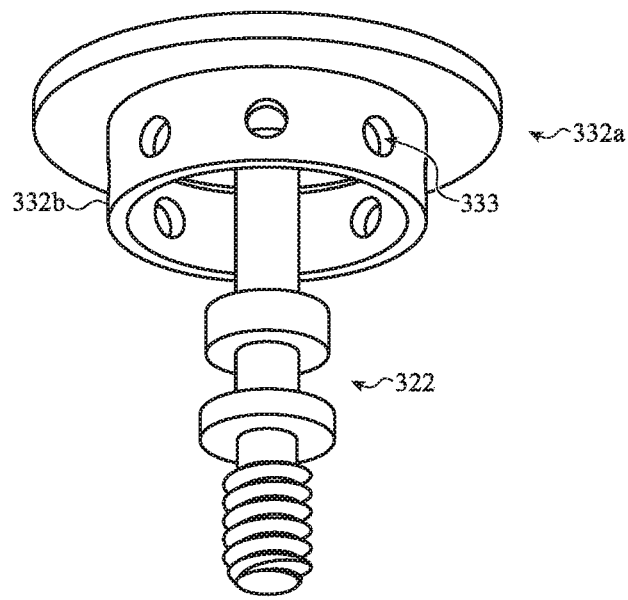
FIGS. 3A-3E show an example embodiment of a crown.
Figure 3B:
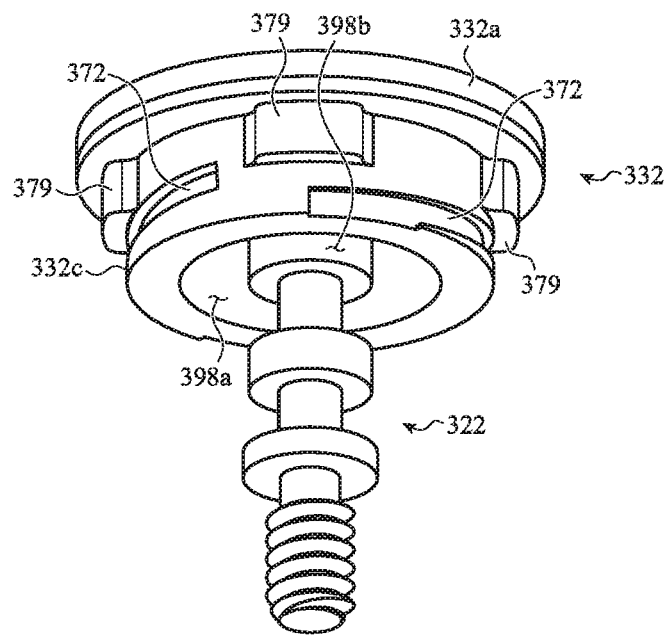
Figure 3C:
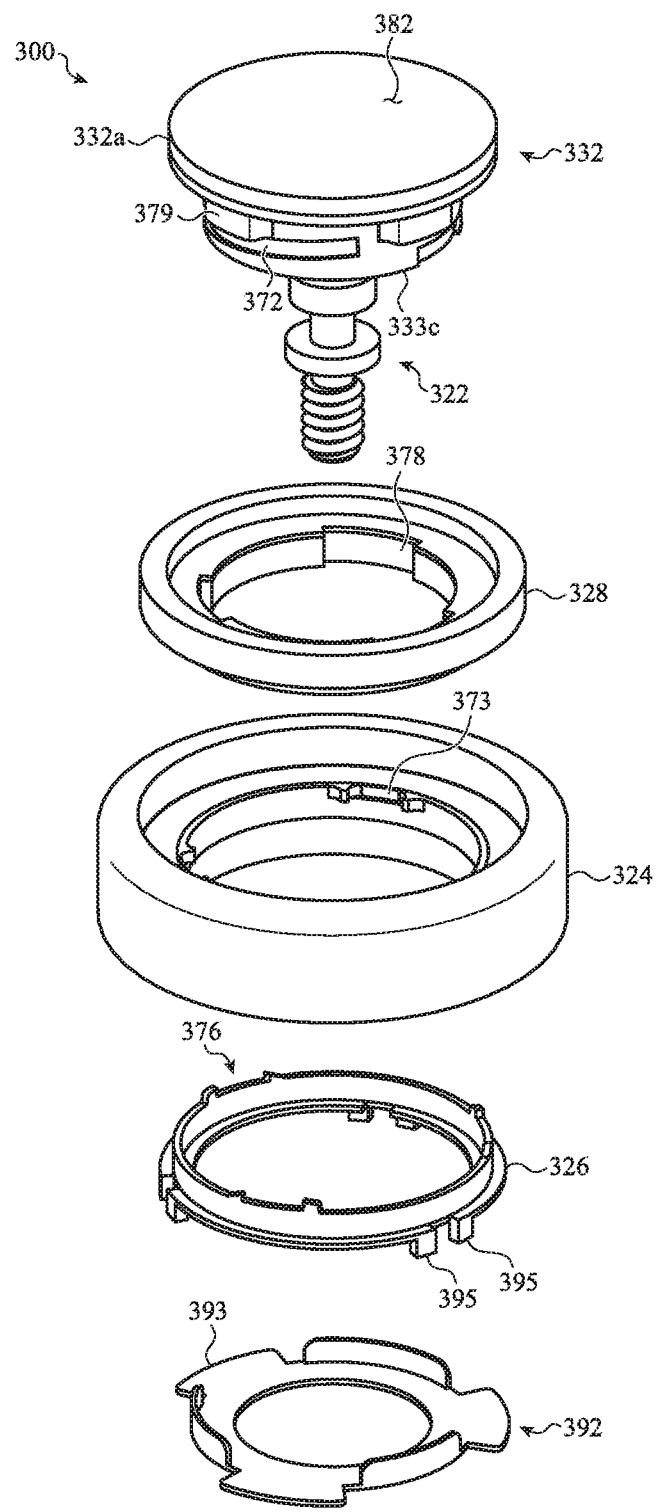
Figure 3D:
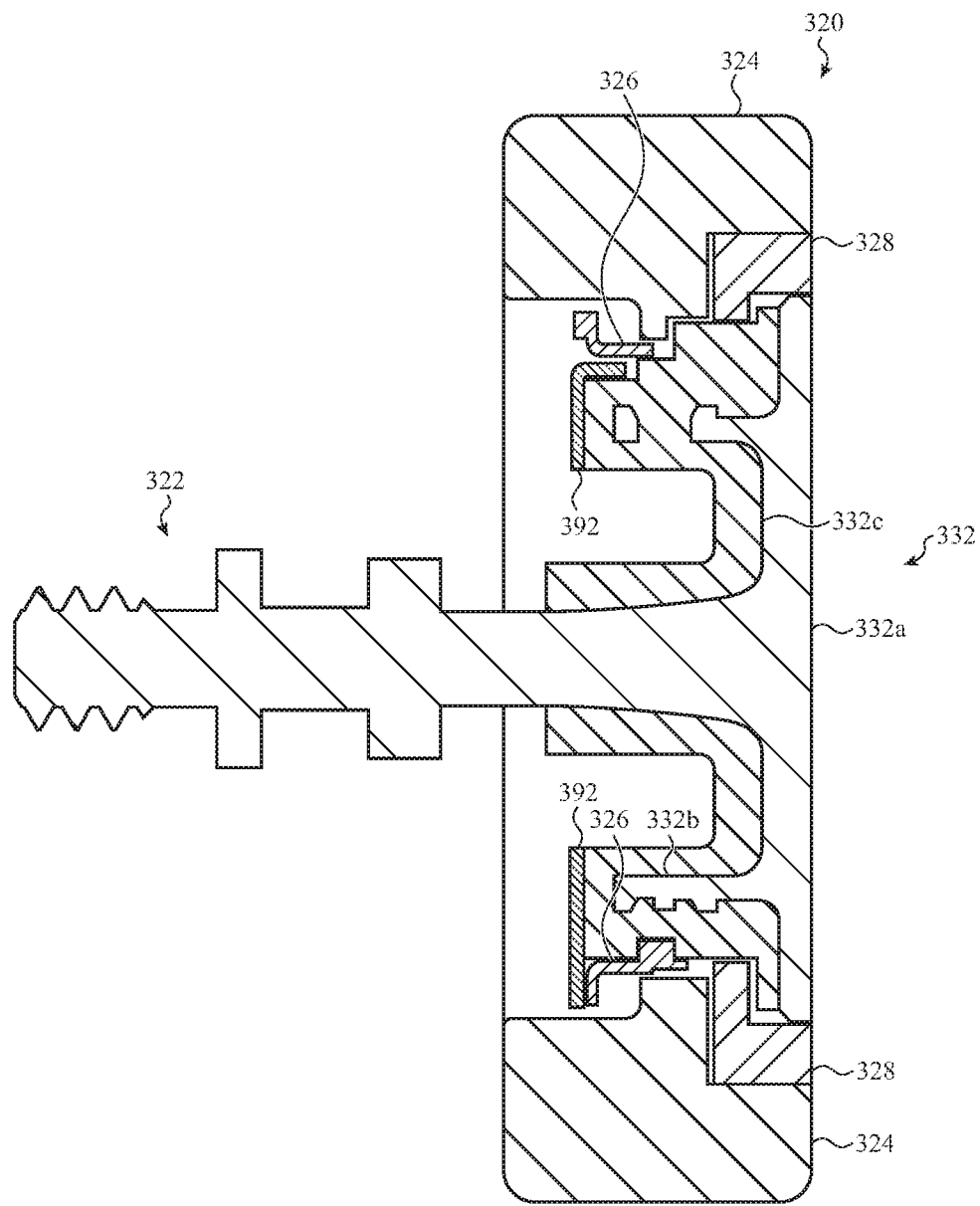

FIGS. 3A-3E shown an example crown 300 having a conductive inner crown body 332 that may be used to perform an electrocardiogram measurement or receive other touch inputs. Similar to the other embodiments described herein, the inner crown body 332 is electrically isolated from the outer crown body 324 by an isolator 328 positioned between the outer crown body and the inner crown body. As shown in FIG. 3D, a retainer 326 is used to couple the inner crown body 332 to the outer crown body 324 and to secure the isolator 328 between the outer crown body and the inner crown body. FIGS. 3A-3C illustrate a shaft 322 and an inner crown 332. In some embodiments, the inner crown 332 includes a head portion 332a (FIG. 3A) that is a portion of a single component that includes the shaft 322 and an attachment portion 332c (FIG. 3B) that is attached to and/or extends from the head portion 332a and/or the shaft 322. For example, the attachment portion 332c may be molded around or otherwise disposed on a wall 332b of the head portion 332a. In various embodiments, the attachment portion 332c may be attached to the head portion 332a in any suitable manner, including injection molding (e.g., overmolding, insert molding), adhesives, fasteners, and the like. In some cases, the head portion 332a includes one or more features to facilitate the attachment between the head portion 332a and the attachment portion 332c. For example, as shown in FIG. 3A, holes 333 on the wall 332b may be filled or otherwise engaged by the attachment portion 332c to more securely attach the attachment portion to the head portion 332a.

As shown in FIG. 3C, the head portion 332a may define a portion 382 of the external surface of the crown 300. For example, the head portion 332a may define a conductive surface for measuring an electrocardiogram and/or receiving other touch inputs, similar to the conductive surface discussed above with respect to FIGS. 2A-2C. In various embodiments, the head portion 332a and/or the shaft 322 may be formed of similar material(s) and have similar features (e.g., coatings) as discussed with respect to the inner crown body 232 and the shaft 222 with respect to FIGS. 2A-2C. In some cases, the head portion 332a may be a separate part from the shaft 322. For example, the head portion 332a may be attached to and/or integrally formed with the shaft 322. Similarly, the wall 332b and the head portion 332a may be portions of a single component or may be attached to and/or integrally formed with one another.

Returning to FIG. 3B, in some cases, the attachment portion 332c may include one or more engagement features 372 for engaging with other components of the crown 300 and/or other components of the electronic device, similar to the engagement features 272 discussed above with respect to FIGS. 2A-2C. In some cases, the attachment portion 332c may include one or more protrusions 379 for creating a mechanical interlock with one or more additional components of the crown 300, similar to the protrusions 279 discussed above with respect to FIGS. 2A-2C. The attachment portion 332c may be formed from any suitable material or combination of materials, such as plastic, metal, or the like. In some cases, the attachment portion 332c is formed from an electrically isolating or other non-conductive material, such as plastic. The attachment portion 332c may cooperate with other components of the crown to electrically isolate the head portion 332a and/or the shaft from other components of the crown, such as the outer crown body 324.

Turning to FIG. 3C, the crown 300 includes the inner crown body 332, the shaft 322, an isolator 328, an outer crown body 324, a retainer 326, and a lock plate 392. Similar to the crown 200 discussed above, the retainer 326 may engage the inner crown body 332 and the outer crown body 324 to couple and retain the components of the crown 300 together. In some cases, the retainer 326 includes retention features 376 that engage the engagement features 372 of the inner crown body 332. As described above with respect to FIG. 2A-2C, the engagement features 372 and the retention features 376 behave similarly to a threaded connector to convert rotational movement or force to linear movement or force. For example, the engagement features 372 may be similar to threads, and the retention features 376 may engage the engagement features 372 and fasten the retainer 326 to the inner crown body 332 as the components are rotated relative to one another.

The isolator 328 and the outer crown body 324 may be similar to the isolator 228 and the outer crown body 224 discussed above with respect to FIGS. 2A-2C. The outer crown body may include features 373 along an inner surface that engage with indentions 378 of the isolator 328 and/or protrusions 379 of the inner crown body 232. The protrusions and indentations may engage with one another to create a mechanical interlock that prevents the isolator 328, the outer crown body 324, and the inner crown body 332 (and thus the shaft 322), from rotating relative to one another when a torque is applied to the crown. This allows a torque applied to the outer crown body 324 to be transferred to the shaft 322, for example to provide rotational inputs.

The retainer 326 may be similar to the retainer 226 discussed above with respect to FIGS. 2A-2C. The retainer 326 may be positioned at least partially around the inner crown body 332 in the assembled configuration and may engage with the inner crown body and/or one or more additional components of the crown 300 to secure the components of the crown together. In various embodiments, the inner crown body 332 and the retainer 326 apply compressive forces to the other components of the crown 300 to secure the components together. For example, at least a portion of the isolator 328 and/or the outer crown body 324 may be positioned between at least a portion of the inner crown body 332 and the retainer 326, and the inner crown body 332 and the retainer 326 apply compressive forces to the components positioned between them to couple the inner crown body to the outer crown body and to secure the isolator between the inner crown body and the outer crown body.

In some cases, the retainer 326 includes one or more retention features 376 that engage with other components of the crown 300 to couple the components of the crown 300 together. For example, the retention features 376 may engage with the engagement features 372 of the inner crown body 332. In some cases, the retention features 376 and/or the engagement features 372 are shaped such that rotating the retainer 326 relative to the inner crown body 332 (and/or rotating the inner crown body relative to the retainer) engages and/or tightens an engagement between the retainer and the inner crown body. For example, as shown in FIG. 3C, the retention features 376 may protrude from an inner surface of the retainer 326, allowing them to engage the engagement features 372. The engagement features 372 and the retention features 276 behave similarly to threads to convert rotational movement or force to linear movement or force. For example, rotating the retainer 326 relative to the inner crown body 332 (and/or rotating the inner crown body relative to the retainer) in a first direction may decrease a distance between the retainer and the inner crown body and/or increase a compressive force exerted on other components of the crown 300 by the retainer and/or the inner crown body. Similarly, rotating the retainer 326 relative to the inner crown body 332 (and/or rotating the inner crown body relative to the retainer) in a second direction opposite the first direction may increase a distance between the retainer and the inner crown body and/or reduce a compressive force exerted on other components of the crown 300 by the retainer and/or the inner crown body. The retainer 326 may be formed from any suitable material or combination of materials, such as plastic, metal, or the like. In some embodiments, the retainer 326 may be molded on and/or integrally formed with one or more additional components of the crown 300 or electronic device.

The lock plate 392 may include one or more features for preventing decoupling of the other components of the crown 300. For example, the lock plate 392 may include features 393 that engage with retention features 395 of the retainer 326 and/or protrusions 379 of the inner crown body 332. In some cases, the lock plate 392 may be attached to the retainer 326 and/or the inner crown body 332 such that the features 393 prevent the retainer from rotating and disengaging from the inner crown body. The lock plate 392 may be attached to one or more components of the crown 300 by any suitable means, including welding, adhesives, mechanical interlocks, and the like. The lock plate 392 may be formed from any suitable material or combination of materials, such as plastic, metal, or the like. In some embodiments, the lock plate 392 may be molded on and/or integrally formed with one or more additional components of the crown 300 or electronic device.

FIG. 3D shows a cross-section of a crown 300 in an assembled configuration. As shown in FIG. 3D, the crown 300 includes a crown body 320 and a shaft 322 extending from the crown body. In various embodiments, the shaft 322 is electrically coupled to the inner crown body 332. As discussed above, the shaft 322 may be attached to and/or integrally formed with one or more components of the crown body 320. For example, the inner crown body 332 and the shaft 322 may be attached, integrally formed, and/or a single part. Generally, the shaft 322 is rotatable and configured to extend through an opening in an enclosure, such as the enclosure described with reference to FIG. 1B.

In some cases, the inner crown body 332, the isolator 328, and the outer crown body 324 cooperate to form an external surface of the crown body 320. As described above with respect to FIGS. 2A and 3C, the isolator 328 may at least partially surround the inner crown body 332, and the outer crown body 324 may at least partially surround the isolator 328 and/or the inner crown body 332. The inner crown body 332 may define a conductive surface of the crown 300. The isolator 328 may electrically isolate the inner crown body 332 and the shaft 322 from the outer crown body 324. In some cases, the inner crown body 332, the isolator 328, and the outer crown body 324 cooperate to form a smooth and continuous external surface of the crown body 320. For example, as shown in FIG. 3D, the portions of the external surface defined by the inner crown body 332, the isolator 328, and the outer crown body 324 are aligned with one another to form a continuous external surface.

Figure 3E:
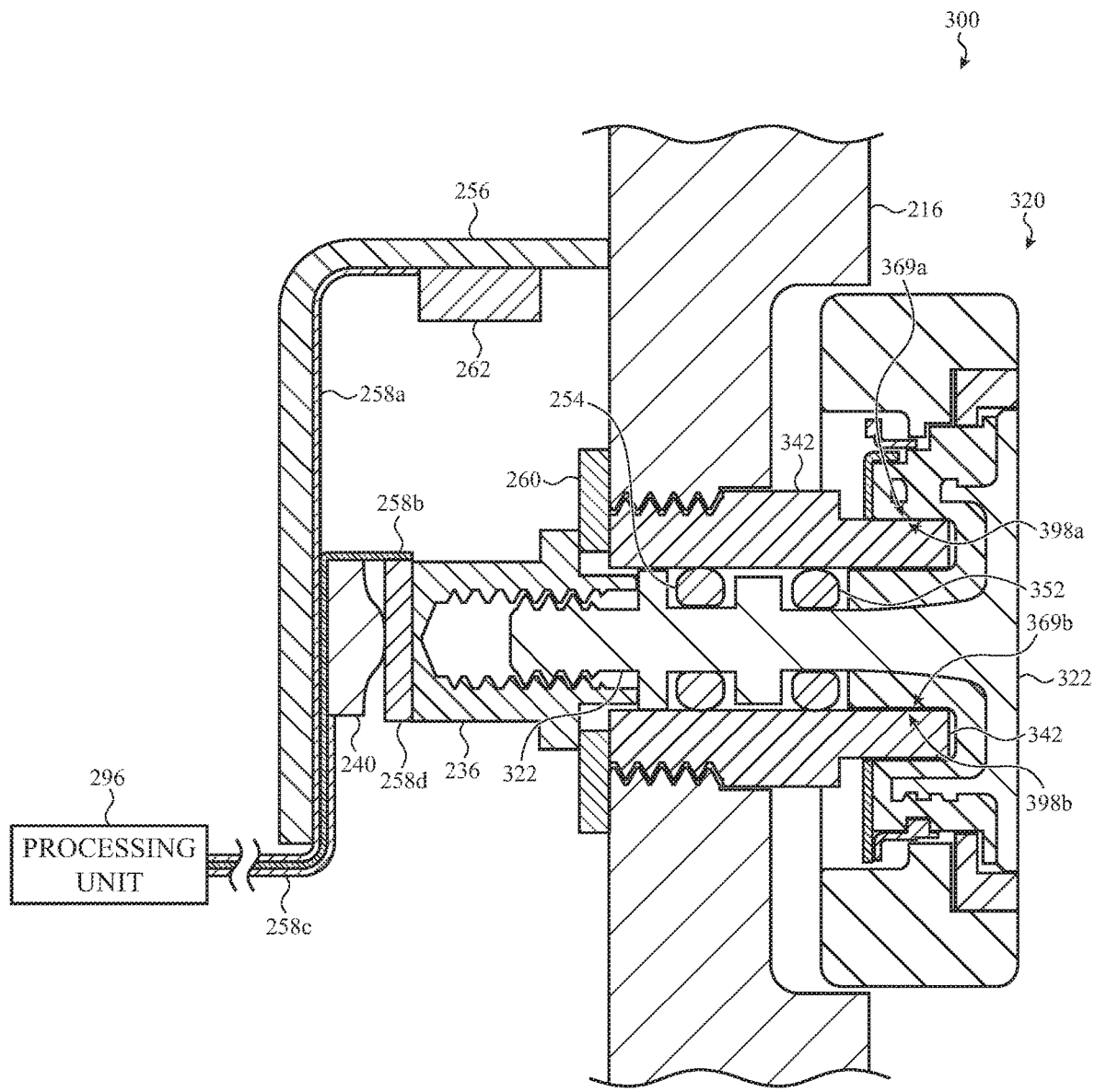

Turning now to FIG. 3E, there is shown an example of a crown 300 installed in an electronic watch, taken through section line A-A of FIG. 1B, as viewed from the front or rear face of a watch body. As shown in FIG. 3E, a collar 342 is disposed in an opening in the enclosure 216 as discussed with respect to FIG. 2C and defines an opening through which the shaft 322 extends. The crown 300 may rotate and or translate relative to the collar 342 during operation. In some cases, the inner crown body 332, and in particular the attachment portion 332c, may define a rotational and/or translational bearing surface between the inner crown body 332 and the collar 342. In some cases, the attachment portion 332c may define a bearing surface 398 configured to contact the collar 342. In some cases, the bearing surface 398 contacts a surface 369 of the collar 342 to stabilize the crown 300 and/or to facilitate consistent rotation of the crown 300. The bearing surface 398 may be concentric to the surface 369 of the collar 342 to allow for consistent rotation of the crown 300 across all angular positions of the crown relative to the electronic device. In some cases, the bearing surface 398 extends across multiple faces of the attachment portion 332c, as shown in FIG. 3C. In some cases, the bearing surface 398 may contact the collar 342 along one or several faces of the collar 342. For example, as shown in FIG. 3C, a face 398a of the bearing surface 398 may contact the collar 342 along a face 369a of the surface 369 and a face 398b of the bearing surface 398 that is opposite the face 398a may contact the collar 342 along a face 369b of the collar that is opposite the face 369a. The attachment portion 332c may further allow for consistent rotation of the crown 300 over time by reducing wear on the crown 300 and/or the collar 342. In some cases, forming the attachment portion 332c using injection molding allows the faces of the surface 398 to be spaced properly from one another to form a precise fit between the crown 300 and the collar 342.

The crown 300 may be similar to the crown 200, may include similar structural components, features, and functionality, and may interact with similar components of an electronic device. Similar to the crown 200, the crown body 320 may be rotated by a user of an electronic watch, to in turn rotate the shaft 322. In some cases, the outer crown body 324 is configured to receive rotational inputs. In some cases, the crown body 320 may also be pulled or pushed by the user to translate the shaft 322 along its axis (e.g., left and right with respect to FIG. 3E). The crown body 320 may be electrically coupled to a circuit within the enclosure 216 (e.g., a processing unit 296), but electrically isolated from the enclosure 216.

Figure 4A:
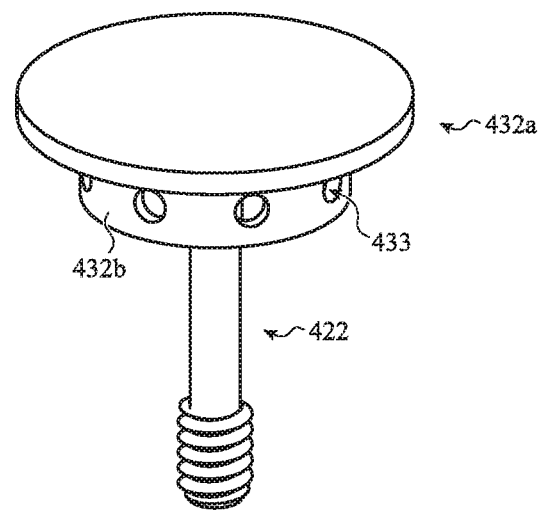
FIGS. 4A-4E show another example embodiment of a crown.
Figure 4B:
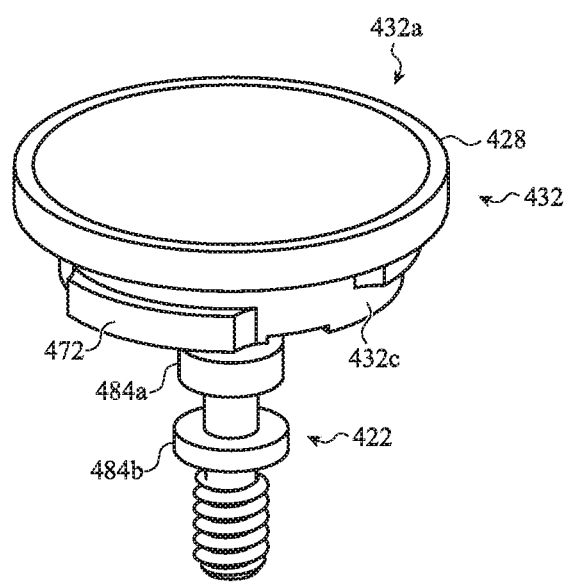

As noted above, in some cases, one or more components may be omitted from the crowns described herein. FIGS. 4A-4E shown an example crown 300 having a conductive inner crown body 432 that may be used to perform an electrocardiogram measurement or receive other touch inputs. Similar to the other embodiments described herein, the inner crown body 432 is electrically isolated from the outer crown body 424 by an isolator 428 positioned between the outer crown body and the inner crown body. FIGS. 4A-4B illustrate a shaft 422, an inner crown body 432, and an isolator 428. In some embodiments, the inner crown body 432 includes a head portion 432a (FIG. 4A) that is a portion of a single component that includes the shaft 422 and an attachment portion 432c, an isolator 428 and features 484a and 484b (FIG. 4B) that are attached to the head portion 432a and/or the shaft 422. For example, the attachment portion 432c, the isolator 428, and or the features 484a and 484b may be molded around or otherwise disposed on a wall 432b of the head portion 432a and/or the shaft 422. In various embodiments, the attachment portion 432c, the isolator 428, and the features 484a and 484b may be attached to the head portion 432a and/or the shaft 422 in any suitable manner, including injection molding (e.g., overmolding, insert molding), adhesives, fasteners, and the like. In some cases, the attachment portion 432c, the isolator 428, and the features 484a and 484b may be portions of a single component (e.g., a molded component) or may be attached to and/or integrally formed with one another. For example, the attachment portion 432c, the isolator 428, and the features 484a and 484b may be a single component that is injection molded to the head portion 432a and/or the shaft 422. Similar to the head portion 332a, the head portion 432a may include one or more features to facilitate the attachment between the head portion 432a, the attachment portion 432c, the isolator 428, and/or the features 484a and 484b. The features 484a and 484b may define grooves around the shaft 422 to receive an O-ring, as shown below in FIG. 4E.

Figure 4C:
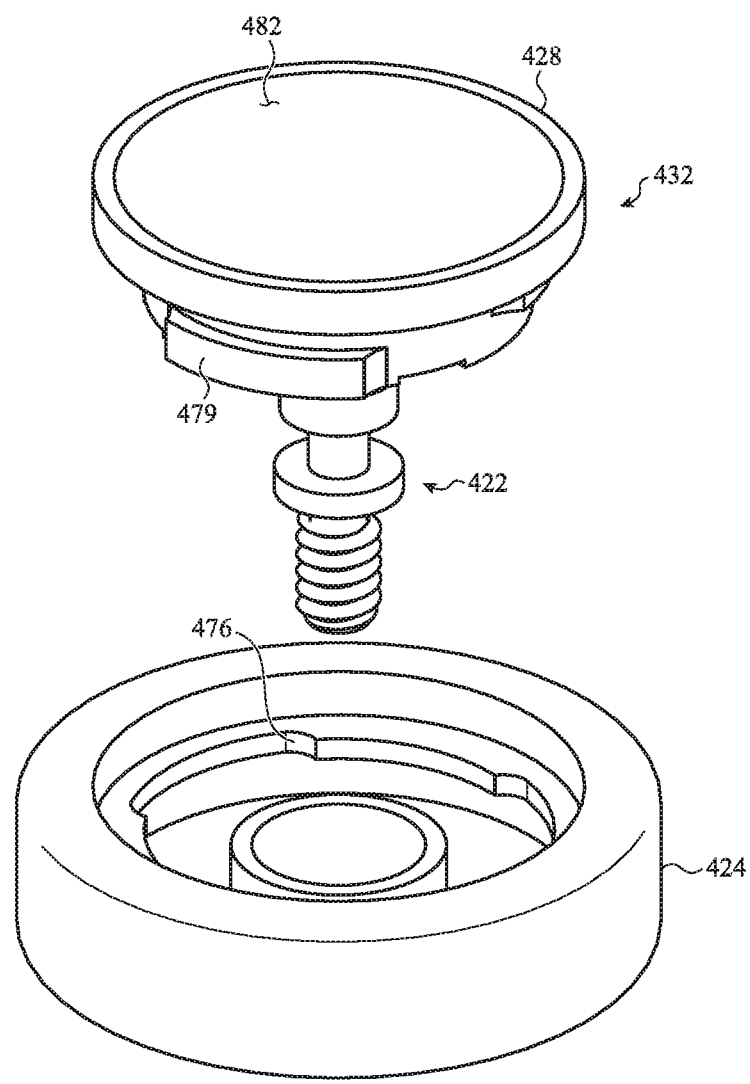

As shown in FIG. 4C, the head portion 432a may define a portion 482 of the external surface of the crown 400. For example, the head portion 432a may define a conductive surface for receiving touch inputs, similar to the conductive surface discussed above with respect to FIGS. 2A-2C. In various embodiments, the head portion 432a and/or the shaft 422 may be formed of similar material(s) and have similar features (e.g., coatings) as discussed with respect to the inner crown bodies 232 and 332 and the shafts 222 and 322 with respect to FIGS. 2A-3E. In some cases, the head portion 432a may be a separate part from the shaft 422. For example, the head portion 432a may be attached to and/or integrally formed with the shaft 422. Similarly, the wall 432b and the head portion 432a may be portions of a single component or may be attached to and/or integrally formed with one another.

Returning to FIG. 4B, in some cases, the attachment portion 432c may include one or more engagement features 472 for engaging with other components of the crown 400 and/or other components of the electronic device, similar to the engagement features 272 and 372 discussed above with respect to FIGS. 2A-3E. The attachment portion 432c may be formed from any suitable material or combination of materials, such as plastic, metal, or the like. In some cases, the attachment portion 432c is formed from an electrically isolating or other non-conductive material, such as plastic. The attachment portion 432c may cooperate with other components of the crown to electrically isolate the head portion 432a and/or the shaft from other components of the crown, such as the outer crown body 424 shown in FIG. 4C.

Turning to FIG. 4C, the crown 400 includes the inner crown body 432, the shaft 422, and an outer crown body 424. The outer crown body 424 may engage the inner crown body 432 to couple and retain the components of the crown 400 together. In some cases, the outer crown body 424 includes retention features 476 that engage the engagement features 472 of the inner crown body 432. In some cases, the engagement features structurally couple the inner crown body 432 to the outer crown body 424. The engagement features 472 may form a mechanical interlock with the retention features 476. In various embodiments, similar to those described above with respect to FIG. 2A-3E, the engagement features 472 and the retention features 476 may behave similarly to a threaded connector to convert rotational movement or force to linear movement or force.

Figure 4D:
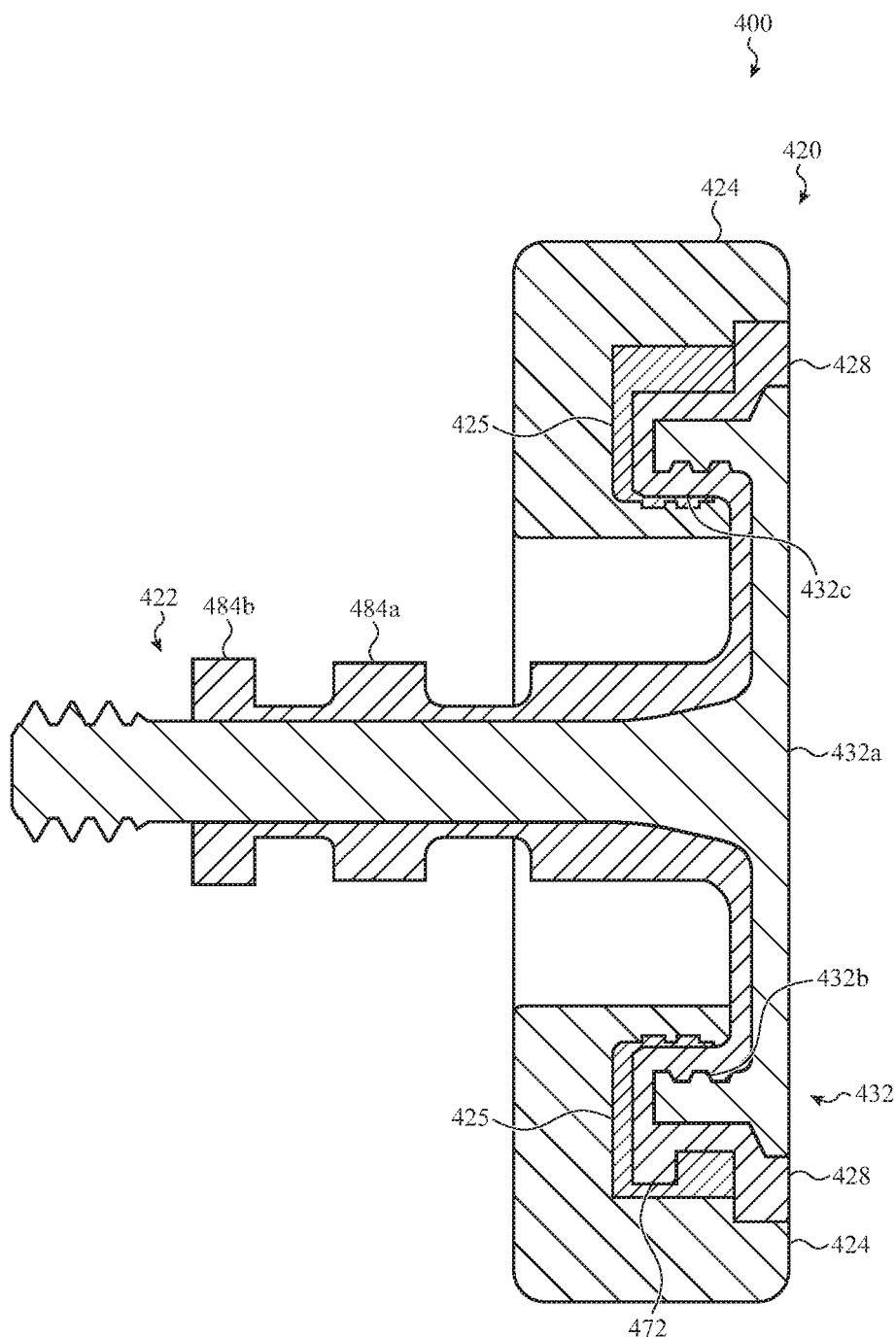

FIG. 4D shows a cross-section of a crown 400 in an assembled configuration. In some cases, as shown in FIG. 4D, the outer crown body 424 and the inner crown body 432 may be attached using a fastening component 425, such as an adhesive, a molded component, or another fastener. In some cases, the outer crown body 424 and the inner crown body 432 may be positioned relative to one another and the fastening component 425 may be injection molded into a gap between the outer crown body and the inner crown body to couple the components. The fastening component 425 may be formed from any suitable material or combination of materials, such as plastic, metal, or the like. In some cases, one or more engagement features 472 and/or retention features 476 may engage the fastening component 425 to create a mechanical interlock between the components.

Figure 4E:
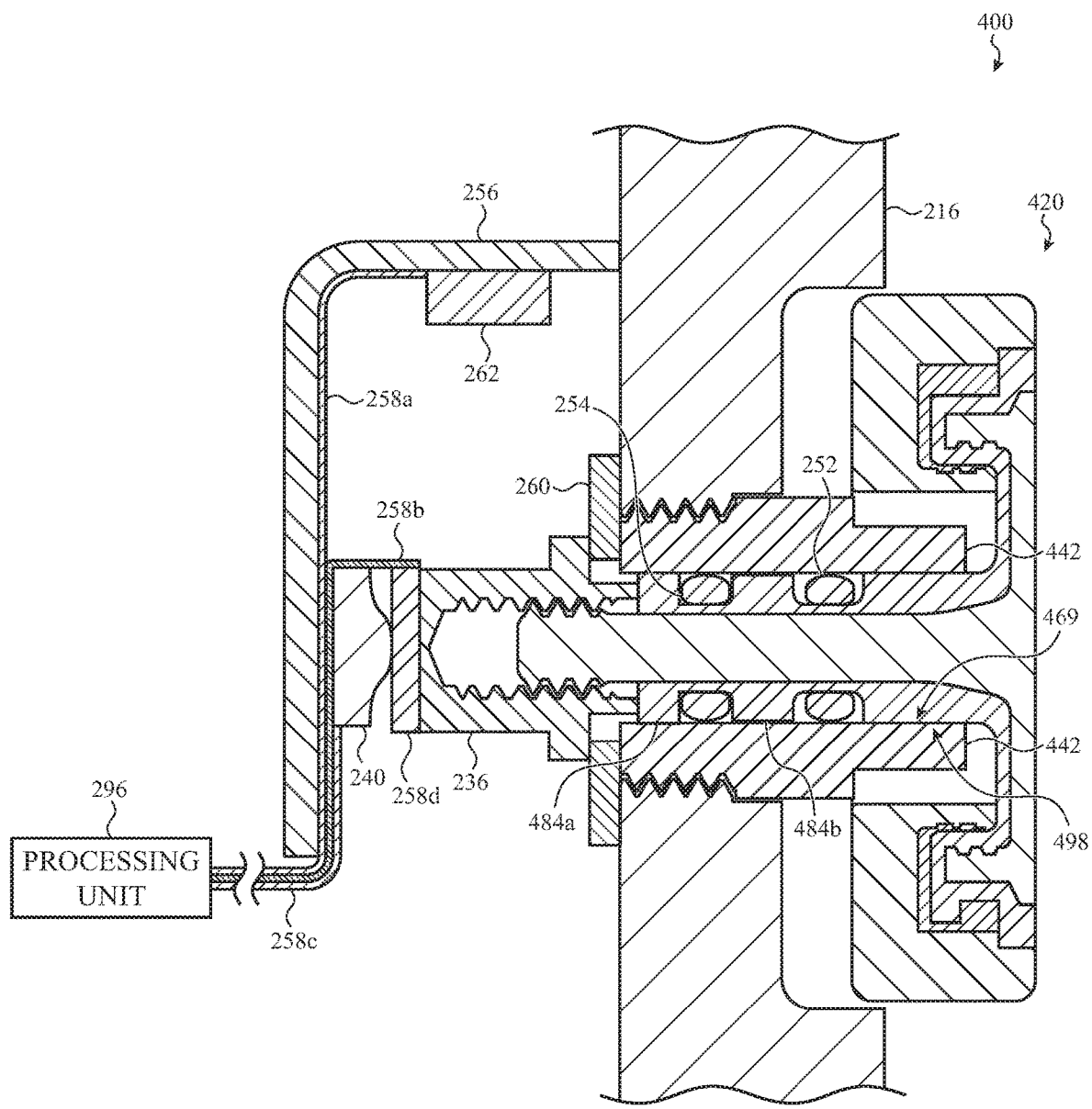

Turning now to FIG. 4E, there is shown an example of the crown 400 installed in an electronic watch, taken through section line A-A of FIG. 1B, as viewed from the front or rear face of a watch body. As shown in FIG. 4E, a collar 442 is disposed in an opening in the enclosure 216 as discussed with respect to FIG. 2C and defines an opening through which the shaft 422 extends. The crown 400 may rotate and or translate relative to the collar 442 during operation. In some cases, the inner crown body 432 and/or the outer crown body 424 may define a rotational and/or translational bearing surface between the crown 400 and the collar 442. In some cases, the attachment portion 432c may define a bearing surface 498 configured to contact the collar 442. In some cases, the bearing surface 498 contacts a surface 469 of the collar 442 to stabilize the crown 400 and/or to facilitate consistent rotation of the crown 400. The bearing surface 498 may be concentric to the surface 469 of the collar 442 to allow for consistent rotation of the crown 400 across all angular positions of the crown relative to the electronic device. The attachment portion 432c may further allow for consistent rotation of the crown 400 over time by reducing wear on the crown 400 and/or the collar 442. In some cases, forming the attachment portion 432c using injection molding allows the faces of the surface 498 to be spaced properly from one another to form a precise fit between the crown 400 and the collar 442.

The crown 400 may be similar to the crowns 200 and 300, may include similar structural components, features, and functionality, and may interact with similar components of an electronic device. Similar to the crowns 200 and 300, the crown body 420 may be rotated by a user of an electronic watch, to in turn rotate the shaft 422. In some cases, the outer crown body 424 is configured to receive rotational inputs. In some cases, the crown body 420 may also be pulled or pushed by the user to translate the shaft 422 along its axis (e.g., left and right with respect to FIG. 4E). The crown body 420 may be electrically coupled to a circuit within the enclosure 216 (e.g., a processing unit 296), but electrically isolated from the enclosure 216.

Figure 5:
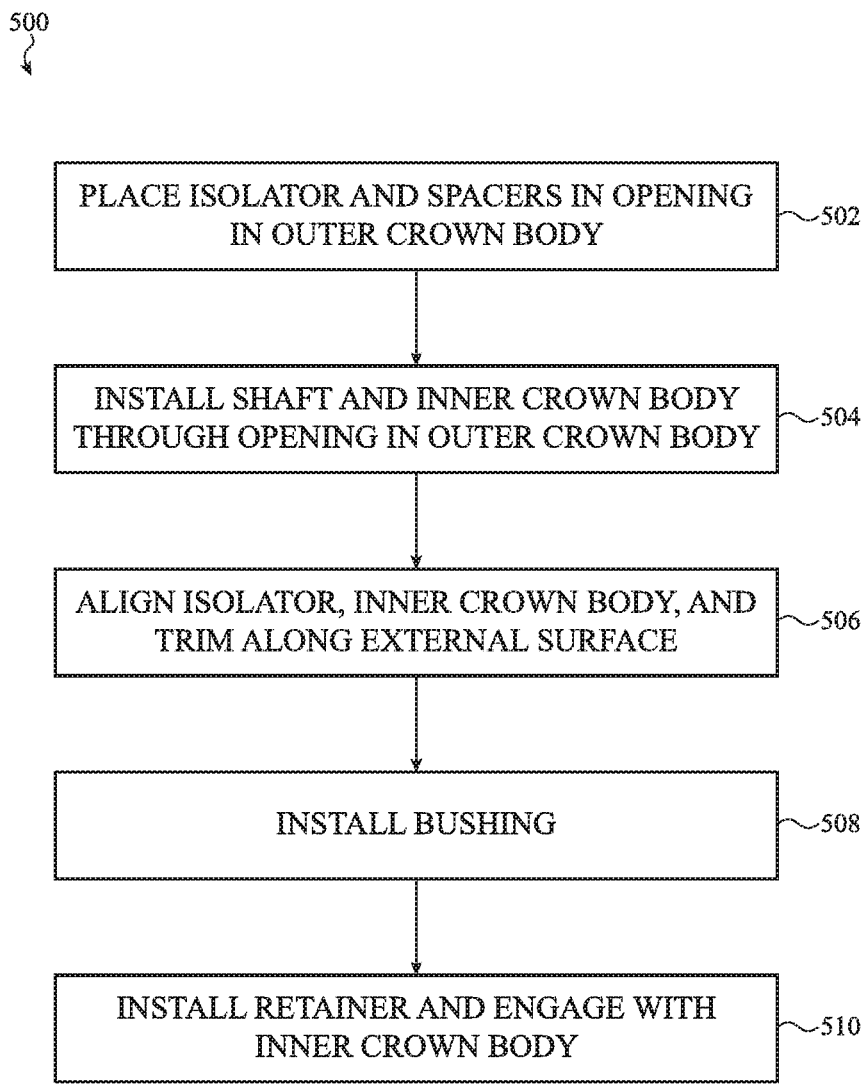
FIG. 5 shows an example method for assembling a crown.

FIG. 5 shows an example method 500 for assembling a crown. At block 502, an isolator (e.g., isolator 228) and one or more spacers (e.g., spacers 223, 227) are placed in a recess in an outer crown body (e.g., outer crown body 224). As discussed above, in some embodiments, the outer crown body defines an opening and a recess (e.g., recess 231) and/or a ledge extending from an internal sidewall defining the opening (e.g., ledge 284). The isolator may be positioned in the recess and/or supported by the ledge. In some cases, a spacer (e.g., spacer 223) is placed in the recess and/or on the ledge and the isolator is placed on the spacer. A second spacer (e.g., spacer 227) may be placed on the isolator. The isolator and/or the second spacer may define a ledge and/or recess that is adapted to receive and/or engage an attachment portion of a shaft (e.g., the inner crown body 232 of the shaft 222). Generally, the isolator, the spacers, and the outer crown body cooperate to form a shaft opening through which the shaft may extend. In some cases, the isolator and/or the spacers may be omitted.

At block 504, an inner crown body (e.g., the inner crown body 232) and a shaft (e.g., the shaft 222) are installed in the shaft opening. As discussed above, in some embodiments, the shaft and the inner crown body are formed as a single component. The shaft may extend through the shaft opening, and the inner crown body may engage the isolator, the outer crown body, and/or the spacers. Generally, the inner crown body is installed such that the isolator and/or the spacers are positioned between the inner crown body and the outer crown body. The isolator and/or the spacers may cooperate to electrically isolate the inner crown body and the outer crown body. In some cases, the shaft and/or the inner crown body may be processed (e.g., machined, coated, or the like) prior to installation.

At block 506, the isolator, the inner crown body, and the outer crown body are aligned along an external surface of the crown. In some cases, the isolator, the inner crown body, and the outer crown body are pressed against a mold, such as a spline match fixture to properly align the components relative to one another. As discussed herein, the isolator, the inner crown body, and/or the outer crown body may define an external surface of the crown 200. The isolator, the inner crown body, and/or the outer crown body may cooperate to form a smooth, continuous surface. In some cases, the spacers include a curable substance, such as a heat-activated film. The spacers may be cured, for example by heating the components to cure heat-activated film, to enable alignment of the components, for example by retaining the components in alignment once the mold is removed.

At block 508, a bushing (e.g., a bushing 229) is installed around the shaft. As discussed above, the bushing may be positioned at least partially around the shaft. In some embodiments, the bushing is positioned along an inner surface of a wall of the inner crown body. The bushing may form a bearing surface configured to contact a component of the electronic device, such as a collar. In some cases, the bushing is fixed with respect to the shaft and/or crown body such that it does not translate or rotate relative to the shaft. In some cases, the bushing may rotate and/or translate relative to the shaft and/or crown body. In some cases, adhesive may be applied to one or more components prior to block 508.

At block 510, a retainer (e.g., retainer 226) is installed and engaged with the crown body. As discussed above, the retainer may draw the components of the crown together to secure them together. For example, the retainer may draw the inner crown body and the outer crown body against the isolator to compress the isolator between the inner crown body and the outer crown body. The retainer may define an opening through which the shaft may extend. As discussed above, the retainer may include one or more retention features (e.g., retention features 276) configured to engage with one or more engagement features of the inner crown body (e.g., engagement features 272) to couple the crown together. In some cases, the retention features and/or the engagement features are shaped such that rotating the retainer relative to the inner crown body (and/or rotating the inner crown body relative to the retainer) engages and/or tightens an engagement between the retainer and the shaft. The retainer may engage the outer crown body, either directly or via a support plate (e.g., support plate 225) positioned between the retainer and the outer crown body. In some cases, adhesive may be applied to one or more components after to block 510.

Figure 6:
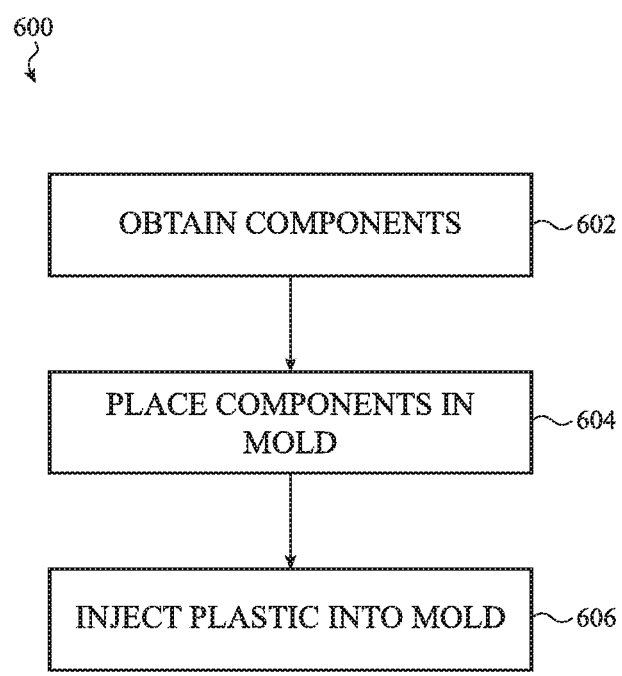
FIG. 6 shows an example method for assembling a crown.

FIG. 6 shows an example method 600 for assembling a crown. At block 602, components for the crown (e.g., components discussed with respect to crowns 200, 300, or 400) are obtained. The components may include an outer crown body (e.g., outer crown body 424), an inner crown body (e.g., inner crown body 432), a shaft (e.g., a shaft 422), as well as additional or alternative components as discussed herein.

At block 604, the components may be placed in a mold. For example, the outer crown body, the inner crown body, the shaft and/or additional or alternative components may be placed in a mold such that the components are positioned relative to one another as they are in the assembled crown. In various embodiments, positioning the components relative to one another may leave gaps between components.

At block 606, plastic (or a similar material) may be injected into the mold to form one or more molded components (e.g., fastening component 425, attachment portion 432c, features 484a and 484b, isolator 428, and the like). In some cases, blocks 604 and/or 606 may be repeated multiple times during assembly of a crown. For example, the steps of blocks 604 and 606 may be used to form a first component (e.g., an attachment portion), and subsequent steps of blocks 604 and 606 may be used to form subsequent component(s) (e.g., a fastening component).

In some cases, some or all of the components of the crown may be insert molded. For example, the isolator and/or the spacers may be insert molded between the shaft and the outer crown body, the bushing may be molded onto the shaft, and so on. Similarly, the crown may include different and/or additional components. For example, the crown may include one or more adhesives or other fasteners to assist in coupling the components together. The methods 500 and 600 are example methods for assembling a crown and are not meant to be limiting. Methods for assembling the crown may omit and/or add steps to the methods 500 or 600. Similarly, steps of the methods 500 or 600 may be performed in different orders than the example order discussed above.

The embodiments of the crown described herein provide a simple and robust input mechanism for receiving rotational, translational, and touch inputs as described above, while simplifying part alignment, ensuring consistent rotation, and allowing for efficient manufacturing. In various embodiments, the crown may be installed in an electronic device, such as an electronic watch. Assembly of the components of the crown may occur prior to, contemporaneously with, and/or after installation of one or more components of the crown into the electronic device.

Figure 7A:
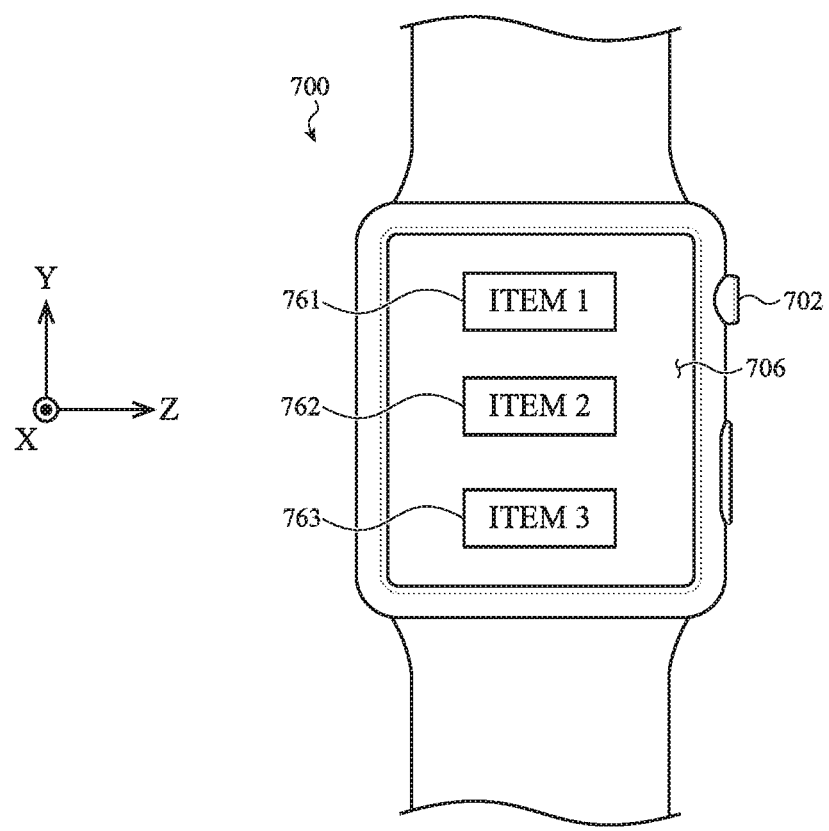
FIGS. 7A-9B generally depict examples of manipulating graphics displayed on an electronic device through inputs provided by force and/or rotational inputs to a crown of the device.

FIG. 7A depicts an example electronic device 700 (shown here as an electronic watch) having a crown 702. The crown 702 may be similar to the examples described above, and may receive force inputs along a first lateral direction, a second lateral direction, or an axial direction of the crown. The crown 702 may also receive rotational inputs, for example at an outer crown body. A display 706 provides a graphical output (e.g., shows information and/or other graphics). In some embodiments, the display 706 may be configured as a touch-sensitive display capable of receiving touch and/or force input. In the current example, the display 706 depicts a list of various items 761, 762, 763, all of which are example indicia.

Figure 7B:
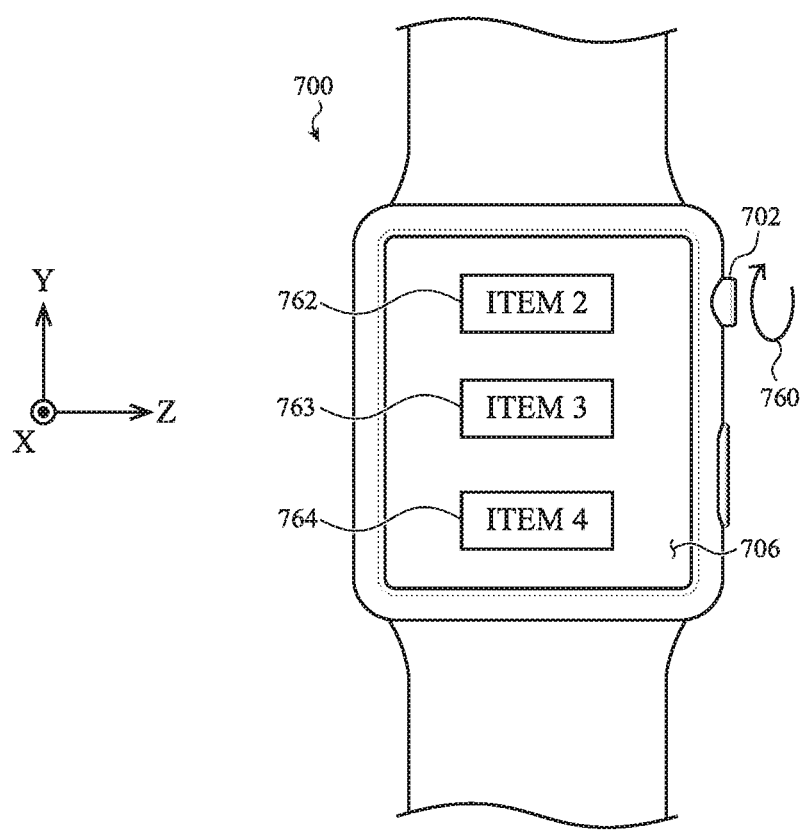

FIG. 7B illustrates how the graphical output shown on the display 706 changes as the crown 702 rotates, partially or completely (as indicated by the arrow 760). Rotating the crown 702 causes the list to scroll or otherwise move on the screen, such that the first item 761 is no longer displayed, the second and third items 762, 763 each move upwards on the display, and a fourth item 764 is now shown at the bottom of the display. This is one example of a scrolling operation that can be executed by rotating the crown 702. Such scrolling operations may provide a simple and efficient way to depict multiple items relatively quickly and in sequential order. A speed of the scrolling operation may be controlled by the amount of rotational force applied to the crown 702 and/or the speed at which the crown 702 is rotated. Faster or more forceful rotation may yield faster scrolling, while slower or less forceful rotation yields slower scrolling. The crown 702 may receive an axial force (e.g., a force inward toward the display 706 or watch body) to select an item from the list, in certain embodiments.

Figure 8A:
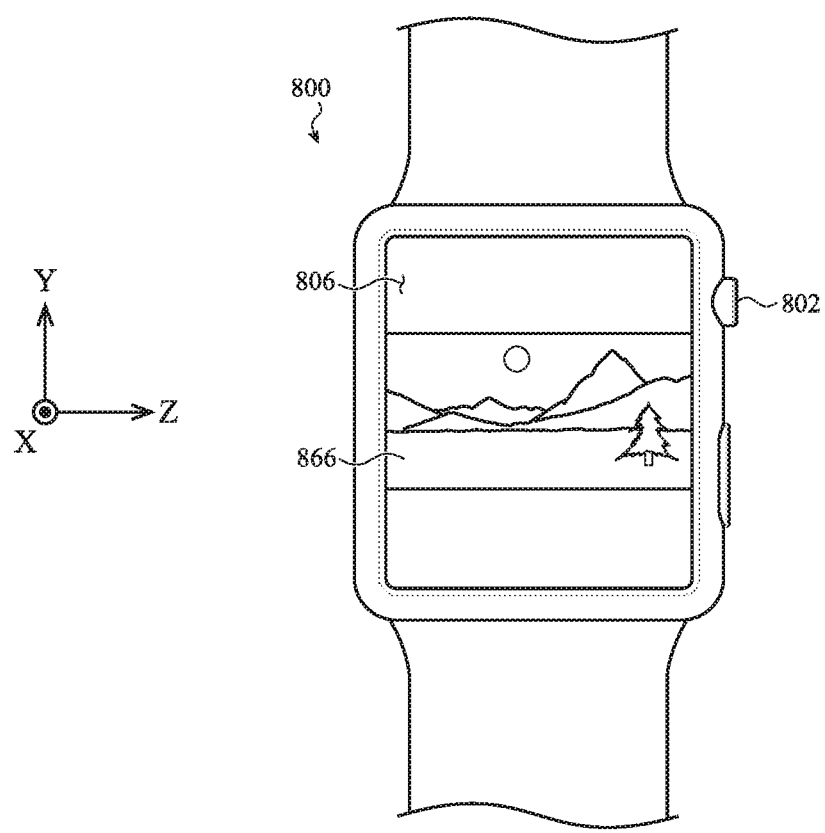
Figure 8B:
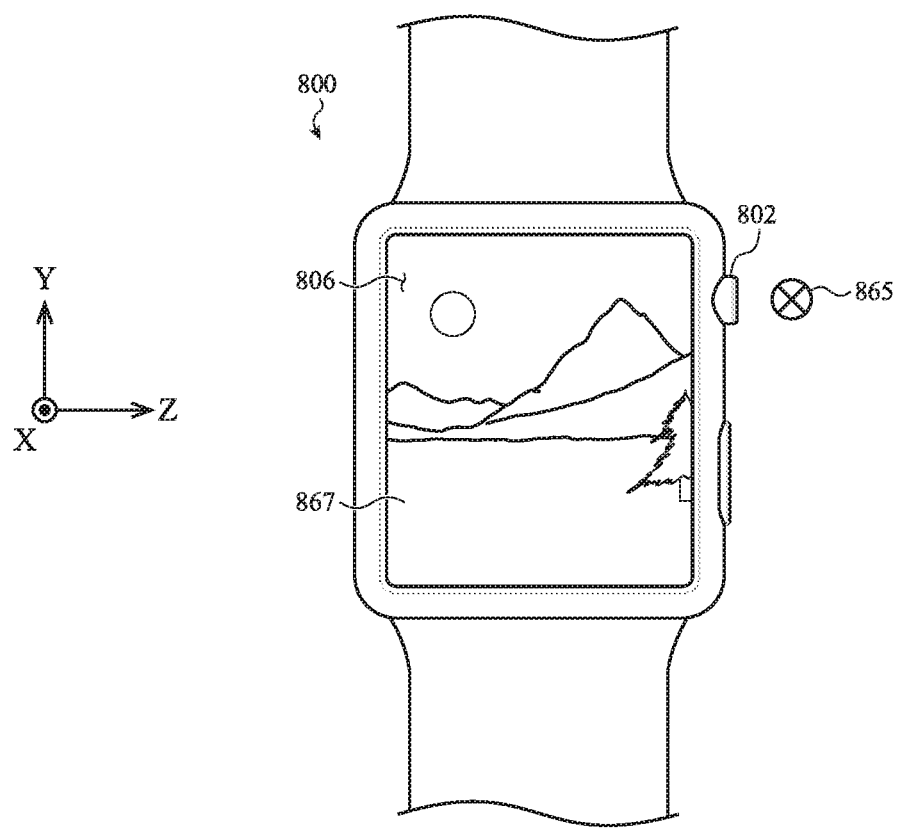

FIGS. 8A and 8B illustrate an example zoom operation. The display 806 depicts a picture 866 at a first magnification, shown in FIG. 8A; the picture 866 is yet another example of an indicium. A user may apply a lateral force (e.g., a force along the x-axis) to the crown 802 of the electronic device 800 (illustrated by arrow 865), and in response the display may zoom into the picture 866, such that a portion 867 of the picture is shown at an increased magnification. This is shown in FIG. 8B. The direction of zoom (in vs. out) and speed of zoom, or location of zoom, may be controlled through force applied to the crown 802, and particularly through the direction of applied force and/or magnitude of applied force. Applying force to the crown 802 in a first direction may zoom in, while applying force to the crown 802 in an opposite direction may zoom out. Alternately, rotating or applying force to the crown 802 in a first direction may change the portion of the picture subject to the zoom effect. In some embodiments, applying an axial force (e.g., a force along the z-axis) to the crown 802 may toggle between different zoom modes or inputs (e.g., direction of zoom vs. portion of picture subject to zoom). In yet other embodiments, applying force to the crown 802 along another direction, such as along the y-axis, may return the picture 866 to the default magnification shown in FIG. 8A.

Figure 9A:
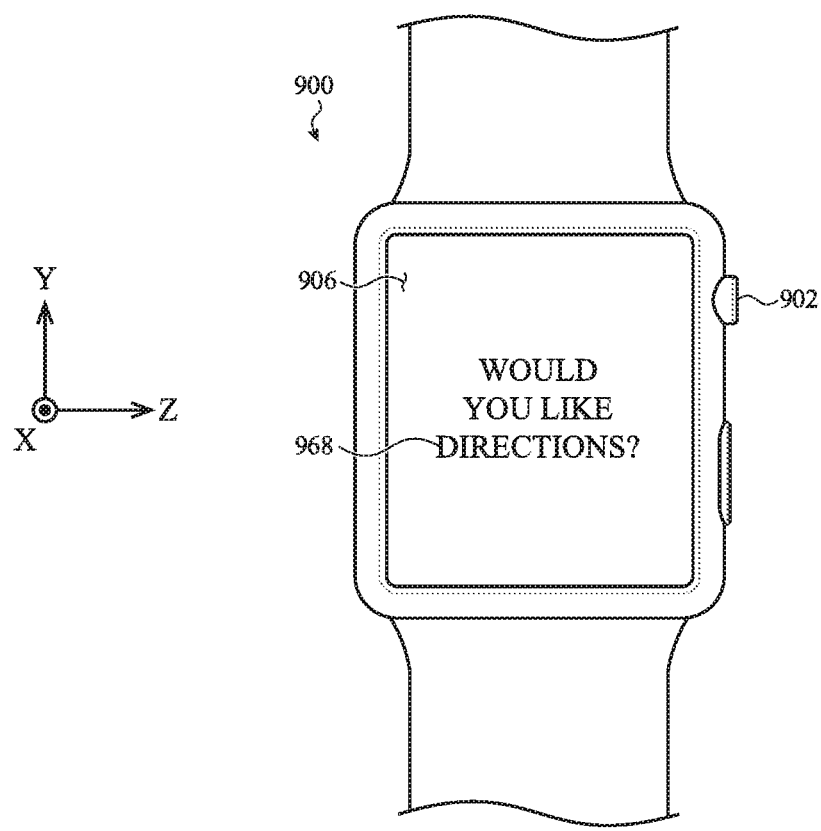
Figure 9B:
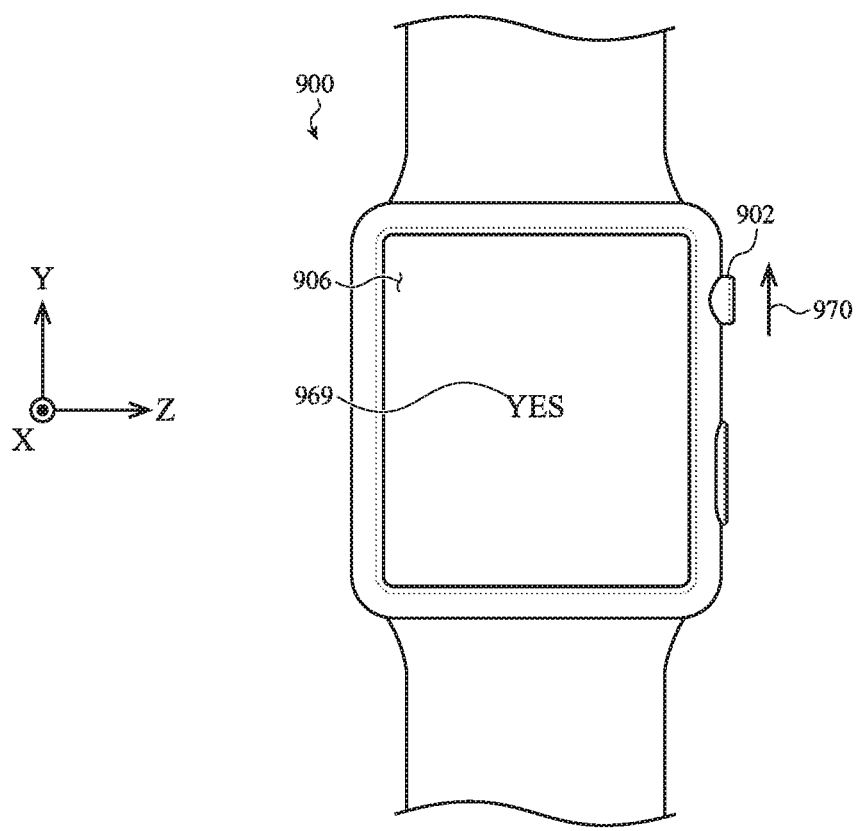

FIGS. 9A and 9B illustrate possible use of the crown 902 to change an operational state of the electronic device 900 or otherwise toggle between inputs. Turning first to FIG. 9A, the display 906 depicts a question 968, namely, "Would you like directions?" As shown in FIG. 9B, a lateral force may be applied to the crown 902 (illustrated by arrow 970) to answer the question. Applying force to the crown 902 provides an input interpreted by the electronic device 900 as "yes," and so "YES" is displayed as a graphic 969 on the display 906. Applying force to the crown 902 in an opposite direction may provide a "no" input. Both the question 968 and graphic 969 are examples of indicia.

In the embodiment shown in FIGS. 9A and 9B, the force applied to the crown 902 is used to directly provide the input, rather than select from options in a list (as discussed above with respect to FIGS. 7A and 7B).

As mentioned previously, force or rotational input to a crown of an electronic device may control many functions beyond those listed here. The crown may receive distinct force or rotational inputs to adjust a volume of an electronic device, a brightness of a display, or other operational parameters of the device. A force or rotational input applied to the crown may rotate to turn a display on or off, or turn the device on or off. A force or rotational input to the crown may launch or terminate an application on the electronic device. Further, combinations of inputs to the crown may likewise initiate or control any of the foregoing functions, as well.

In some cases, the graphical output of a display may be responsive to inputs applied to a touch-sensitive display (e.g., displays 706, 806, 906, and the like) in addition to inputs applied to a crown. The touch-sensitive display may include or be associated with one or more touch and/or force sensors that extend along an output region of a display and which may use any suitable sensing elements and/or sensing techniques to detect touch and/or force inputs applied to the touch-sensitive display. The same or similar graphical output manipulations that are produced in response to inputs applied to the crown may also be produced in response to inputs applied to the touch-sensitive display. For example, a swipe gesture applied to the touch-sensitive display may cause the graphical output to move in a direction corresponding to the swipe gesture. As another example, a tap gesture applied to the touch-sensitive display may cause an item to be selected or activated. In this way, a user may have multiple different ways to interact with and control an electronic watch, and in particular the graphical output of an electronic watch. Further, while the crown may provide overlapping functionality with the touch-sensitive display, using the crown allows for the graphical output of the display to be visible (without being blocked by the finger that is providing the touch input).

Figure 10:
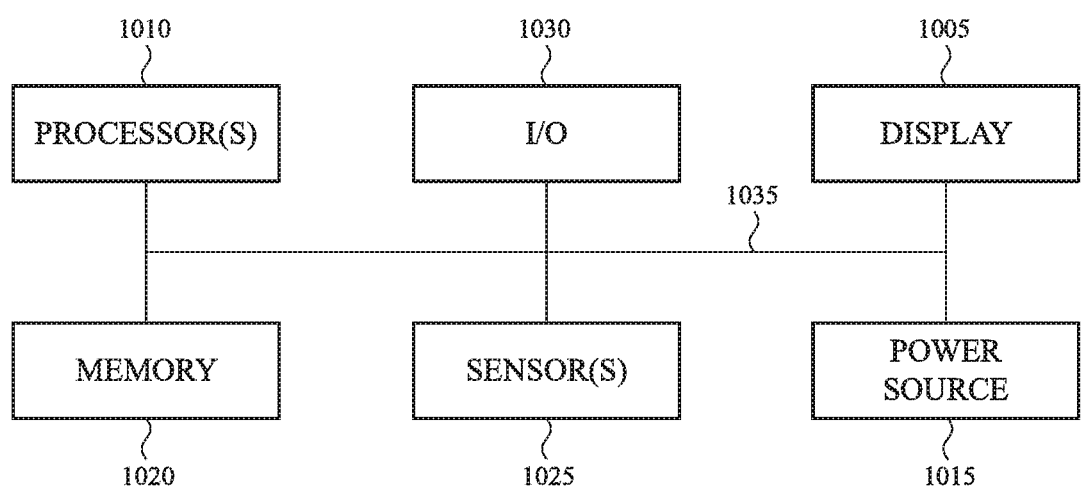
FIG. 10 shows a sample electrical block diagram of an electronic device such as a watch or other wearable electronic device.

FIG. 10 shows a sample electrical block diagram of an electronic device 1000, which electronic device may in some cases take the form of any of the electronic watches or other wearable electronic devices described with reference to FIGS. 1-9, or other portable or wearable electronic devices. The electronic device 1000 can include a display 1005 (e.g., a light-emitting display), a processing unit 1010, a power source 1015, a memory 1020 or storage device, a sensor 1025, and an input/output (I/O) mechanism 1030 (e.g., an input/output device, input/output port, or haptic input/output interface). The processing unit 1010 can control some or all of the operations of the electronic device 1000. The processing unit 1010 can communicate, either directly or indirectly, with some or all of the components of the electronic device 1000. For example, a system bus or other communication mechanism 1035 can provide communication between the processing unit 1010, the power source 1015, the memory 1020, the sensor 1025, and the input/output mechanism 1030.

The processing unit 1010 can be implemented as any electronic device capable of processing, receiving, or transmitting data or instructions. For example, the processing unit 1010 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 1000 can be controlled by multiple processing units. For example, select components of the electronic device 1000 (e.g., a sensor 1025) may be controlled by a first processing unit and other components of the electronic device 1000 (e.g., the display 1005) may be controlled by a second processing unit, where the first and second processing units may or may not be in communication with each other. In some cases, the processing unit 1010 may determine a biological parameter of a user of the electronic device, such as an ECG for the user.

The power source 1015 can be implemented with any device capable of providing energy to the electronic device 1000. For example, the power source 1015 may be one or more batteries or rechargeable batteries. Additionally or alternatively, the power source 1015 can be a power connector or power cord that connects the electronic device 1000 to another power source, such as a wall outlet.

The memory 1020 can store electronic data that can be used by the electronic device 1000. For example, the memory 1020 can store electrical data or content such as, for example, audio and video files, documents and applications, device settings and user preferences, timing signals, control signals, and data structures or databases. The memory 1020 can be configured as any type of memory. By way of example only, the memory 1020 can be implemented as random access memory, read-only memory, Flash memory, removable memory, other types of storage elements, or combinations of such devices.

The electronic device 1000 may also include one or more sensors 1025 positioned almost anywhere on the electronic device 1000. The sensor(s) 1025 can be configured to sense one or more type of parameters, such as but not limited to, pressure, light, touch, heat, movement, relative motion, biometric data (e.g., biological parameters), and so on. For example, the sensor(s) 1025 may include a heat sensor, a position sensor, a light or optical sensor, an accelerometer, a pressure transducer, a gyroscope, a magnetometer, a health monitoring sensor, and so on. Additionally, the one or more sensors 1025 can utilize any suitable sensing technology, including, but not limited to, capacitive, ultrasonic, resistive, optical, ultrasound, piezoelectric, and thermal sensing technology. In some examples, the sensors 1025 may include one or more of the electrodes described herein (e.g., one or more electrodes on an exterior surface of a cover sheet that forms part of an enclosure for the electronic device 1000 and/or an electrode on a crown body, button, or other enclosure member of the electronic device).

The I/O mechanism 1030 can transmit and/or receive data from a user or another electronic device. An I/O device can include a display, a touch sensing input surface, one or more buttons (e.g., a graphical user interface "home" button), one or more cameras, one or more microphones or speakers, one or more ports such as a microphone port, and/or a keyboard. Additionally or alternatively, an I/O device or port can transmit electronic signals via a communications network, such as a wireless and/or wired network connection. Examples of wireless and wired network connections include, but are not limited to, cellular, Wi-Fi, Bluetooth, IR, and Ethernet connections.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic watch comprising:
an enclosure defining an opening;
a crown extending through the opening and configured to rotate relative to the enclosure and translate relative to the enclosure, the crown comprising:
an inner crown body defining an exposed conductive surface, the exposed conductive surface defining an electrode configured to detect a voltage of a user in contact with the electrode to determine an electrocardiogram of the user;
an outer crown body at least partially surrounding the inner crown body;
an isolator positioned between the inner crown body and the outer crown body and electrically isolating the inner crown body from the outer crown body; and
a retainer coupling the inner crown body to the outer crown body and securing the isolator between the inner crown body and the outer crown body;
a processing unit operably coupled to the electrode and configured to determine the electrocardiogram of the user based at least partially on the voltage detected at the electrode; and
a display positioned at least partially within the enclosure and configured to provide a graphical output that is responsive to each of a rotational input received by the crown, a translational input received by the crown, and the electrocardiogram.

2. The electronic watch of claim 1, wherein:
the electrode is a first electrode;
the voltage is a first voltage;
the exposed conductive surface is a first exposed conductive surface;
the enclosure defines a second exposed conductive surface, the second exposed conductive surface defining a second electrode configured to detect a second voltage of the user to determine the electrocardiogram of the user;
the processing unit is operably coupled to the second electrode; and
the processing unit is further configured to:
determine the electrocardiogram based at least partially on the second voltage detected at the second electrode; and
in response to determining the electrocardiogram, modify the graphical output of the display.

3. The electronic watch of claim 1, wherein:
the crown further comprises a shaft extending from the inner crown body and extending through the opening;
the inner crown body defines a wall having an engagement feature;
the retainer extends around the shaft and defines a retention feature; and
the retention feature of the retainer engages the engagement feature of the inner crown body thereby coupling the inner crown body to the outer crown body.

4. The electronic watch of claim 3, wherein the retention feature is configured to engage the engagement feature as the retainer is rotated relative to the inner crown body.

5. The electronic watch of claim 1, wherein:
the crown further comprises a shaft extending from the inner crown body and extending through the opening;
the shaft is electrically and structurally coupled to the inner crown body; and
the shaft electrically couples the exposed conductive surface to the processing unit.

6. The electronic watch of claim 5, wherein the shaft is integrally formed with the inner crown body.

7. The electronic watch of claim 1, wherein the isolator defines at least a portion of an external surface of the crown.

8. The electronic watch of claim 1, wherein:
the electronic watch further comprises a collar extending from the opening; and
the crown further comprises a bushing coupled to the inner crown body and defining a bearing surface that is in contact with an outer surface of the collar.

9. A wearable electronic device comprising:
an enclosure;
a crown configured to rotate and translate relative to the enclosure and comprising:
a conductive shaft configured to extend through an opening in the enclosure;
an inner crown body structurally coupled to the conductive shaft and defining an exposed conductive surface that is conductively coupled to the conductive shaft, the exposed conductive surface defining an electrode configured to detect a voltage of a user in contact with the electrode to determine an electrocardiogram of the user;
an outer crown body positioned around the inner crown body;
an isolator positioned between the outer crown body and the inner crown body; and
a retainer configured to compress the isolator between the outer crown body and the inner crown body; and
a processing system electrically coupled to the electrode through the conductive shaft and configured to determine the electrocardiogram based at least partially on the voltage detected at the electrode.

10. The wearable electronic device of claim 9, wherein the retainer is configured to compress the isolator between the outer crown body and the inner crown body as the retainer is rotated relative to the inner crown body.

11. The wearable electronic device of claim 10, wherein the retainer is further configured to:
couple the outer crown body to the inner crown body; and
secure the isolator between the outer crown body and the inner crown body.

12. The wearable electronic device of claim 9, wherein the isolator comprises a cosmetic ring that defines a portion of an external surface of the crown.

13. The wearable electronic device of claim 9, wherein the conductive shaft is a separate component that is attached to the inner crown body.

14. An electronic watch comprising:
an enclosure defining an opening;
a crown positioned along a side of the enclosure, wherein the crown is rotatable relative to the enclosure and translatable relative to the enclosure and comprises:
a conductive inner crown body electrically coupled to the processing unit, the conductive inner crown body defining an exposed conductive surface, the exposed conductive surface defining an electrode configured to detect a voltage of a user in contact with the electrode to determine an electrocardiogram of the user;
a shaft extending from the conductive inner crown body and through the opening;
an outer crown body surrounding the conductive inner crown body; and
an isolator positioned between the conductive inner crown body and the outer crown body and electrically isolating the conductive inner crown body from the outer crown body; and
a processing unit positioned within the enclosure and conductively coupled to the electrode through the shaft, the processing unit configured to determine the electrocardiogram of the user based at least in part on the voltage detected at the electrode.

15. The electronic watch of claim 14, wherein:
the electronic watch further comprises:
a display configured to provide a graphical output and receive a touch input; and
a sensor configured to detect at least one of a rotational input received by the crown or a translational input received by the crown; and
the processing unit is configured to modify the graphical output provided by the display in response to each of the rotational input, the translational input, and the touch input.

16. The electronic watch of claim 14, wherein:
the electrode is a first electrode;
the exposed conductive surface is a first exposed conductive surface;
the voltage is a first voltage;
the enclosure defines a second exposed conductive surface electrically isolated from the first exposed conductive surface, the second exposed conductive surface defining a second electrode configured to detect a second voltage of the user to determine the electrocardiogram of the user; and
the processing unit is configured to determine the electrocardiogram using the first voltage sensed at the first electrode and the second voltage sensed at the second electrode.

17. The electronic watch of claim 16, wherein:
the electronic watch further comprises a display configured to provide a graphical output; and
the processing unit is configured to modify the graphical output of the display in response to determining the electrocardiogram.

18. The electronic watch of claim 14, wherein the isolator is insert molded between the conductive inner crown body and the outer crown body.

19. The electronic watch of claim 14, wherein the isolator is overmolded over at least one of the conductive inner crown body or the outer crown body.

20. The electronic watch of claim 14, wherein the crown further comprises a retainer coupling the conductive inner crown body to the outer crown body.

* * * * *